US006785985B2

(12) United States Patent
Marvin et al.

(10) Patent No.: US 6,785,985 B2
(45) Date of Patent: Sep. 7, 2004

(54) SHOE HAVING AN INFLATABLE BLADDER

(75) Inventors: William Marvin, Brighton, MA (US);
Paul M. Davis, Blackstone, MA (US);
Geoff Swales, Somerset, MA (US);
Paul E. Litchfield, Westboro, MA (US)

(73) Assignee: Reebok International Ltd., Canton, MA (US)

( * ) Notice: Subject to any disclaimer, the term of this patent is extended or adjusted under 35 U.S.C. 154(b) by 19 days.

(21) Appl. No.: 10/186,717

(22) Filed: Jul. 2, 2002

(65) Prior Publication Data

US 2004/0003515 A1 Jan. 8, 2004

(51) Int. Cl.[7] .......................... A43B 13/20; A43B 23/00; A43B 5/00
(52) U.S. Cl. .................................... 36/45; 36/29; 36/88
(58) Field of Search ............................... 36/29, 28, 88, 36/50.1, 43, 71, 50.5, 3 R, 3 B, 44, 114, 93

(56) References Cited

U.S. PATENT DOCUMENTS

| 82,944 A | 10/1868 | Haskins |
|---|---|---|
| 167,732 A | 10/1875 | Blanchard |
| 180,819 A | 8/1876 | Ames |
| 212,898 A | 3/1879 | Class |
| 508,034 A | 11/1893 | Moore |
| 510,504 A | 12/1893 | Foster |
| 536,345 A | 3/1895 | Harris |
| 545,705 A | 9/1895 | MacDonald |
| 547,645 A | 10/1895 | LaCroix |
| 566,422 A | 8/1896 | Singleton |
| 580,501 A | 4/1897 | Mobberley |
| 586,155 A | 7/1897 | Bascom |
| 634,588 A | 10/1899 | Roche |
| D32,093 S | 1/1900 | Childs |
| 692,170 A | 1/1902 | Wallerstein et al. |
| 710,674 A | 10/1902 | Fassmann |
| 850,327 A | 4/1907 | Tauber |
| 900,867 A | 10/1908 | Miller |
| 918,391 A | 4/1909 | Taarud |
| 950,333 A | 2/1910 | Koch |

(List continued on next page.)

FOREIGN PATENT DOCUMENTS

| BR | 8305004 | 9/1983 |
|---|---|---|
| CA | 1143938 | 11/1982 |

(List continued on next page.)

OTHER PUBLICATIONS

ZONIC Product Description, date unknown.
Superflate by Innovations in Cycling, Inc., Interbike Buyer 1991 International Bicycle Expos, p. 145.

(List continued on next page.)

Primary Examiner—M. D. Patterson
(74) Attorney, Agent, or Firm—Sterne, Kessler, Goldstein & Fox PLLC

(57) ABSTRACT

An article of footwear including a sole and an upper with an exterior and interior surface, and a bladder which comprises at least one of the exterior or interior surfaces. The bladder comprising sheets of polyurethane attached together via welding. The bladder includes a medial compartment and a lateral compartment attached to each other under the foot of the wearer. The article of footwear also includes a inflation mechanism for selectively introducing air to the chambers. The inflation mechanism is located under the foot of the wearer to be activated by the normal action of the wearer.

32 Claims, 7 Drawing Sheets

U.S. PATENT DOCUMENTS

| | | |
|---|---|---|
| 1,034,915 A | 5/1912 | Spinney |
| 1,053,204 A | 2/1913 | Morrison |
| 1,059,485 A | 4/1913 | Orlopp |
| 1,069,001 A | 7/1913 | Guy |
| 1,071,271 A | 8/1913 | Spangler |
| 1,145,534 A | 7/1915 | Wetmore |
| 1,148,376 A | 7/1915 | Gay |
| 1,193,608 A | 8/1916 | Poulson |
| 1,198,476 A | 9/1916 | Pearson |
| 1,216,795 A | 2/1917 | Gause |
| 1,235,645 A | 8/1917 | Blatz et al. |
| 1,241,832 A | 10/1917 | Drunkenmiller |
| 1,257,086 A | 2/1918 | Marcellus |
| 1,285,695 A | 11/1918 | Harman |
| 1,322,338 A | 11/1919 | Pitts |
| 1,328,154 A | 1/1920 | Jackerson |
| D55,436 S | 6/1920 | Seiders |
| 1,369,555 A | 2/1921 | Schweinert et al. |
| 1,383,067 A | 6/1921 | Borman |
| 1,422,716 A | 7/1922 | Jones |
| 1,444,189 A | 2/1923 | Key |
| 1,450,934 A | 4/1923 | Wilson |
| 1,498,838 A | 6/1924 | Harrison, Jr. |
| 1,531,731 A | 3/1925 | Burgess |
| 1,602,675 A | 10/1926 | Hurley |
| 1,605,985 A | 11/1926 | Rasmussen |
| 1,630,445 A | 5/1927 | Murray |
| 1,637,219 A | 7/1927 | Edelmann |
| 1,776,750 A | 9/1930 | Burns |
| 1,802,523 A | 4/1931 | Morangier |
| 1,818,178 A | 8/1931 | Weisberg |
| 1,869,257 A | 7/1932 | Hitzler |
| 1,940,542 A | 12/1933 | Goth |
| 1,954,122 A | 4/1934 | Fiori |
| 1,979,972 A | 11/1934 | Guild |
| 2,001,821 A | 5/1935 | Everston |
| 2,002,527 A | 5/1935 | Dorogi et al. |
| 2,007,803 A | 7/1935 | Kelly |
| 2,015,882 A | 10/1935 | Brewer |
| 2,016,113 A | 10/1935 | Lambert et al. |
| 2,020,240 A | 11/1935 | Cochran |
| 2,036,695 A | 4/1936 | Heigis |
| 2,038,473 A | 4/1936 | Bronson |
| 2,070,116 A | 2/1937 | Cutillo |
| 2,074,286 A | 3/1937 | Sullivan |
| 2,080,469 A | 5/1937 | Gilbert |
| 2,080,499 A | 5/1937 | Nathansohn |
| 2,147,197 A | 2/1939 | Glidden |
| 2,177,116 A | 10/1939 | Persichino |
| 2,205,938 A | 6/1940 | Ward |
| 2,275,720 A | 3/1942 | Bingham, Jr. |
| D133,459 S | 8/1942 | Corley |
| 2,325,639 A | 8/1943 | Stritter |
| 2,368,091 A | 1/1945 | Andersen |
| 2,476,545 A | 7/1949 | Hayward |
| 2,488,382 A | 11/1949 | Davis |
| 2,498,596 A | 2/1950 | Wallach |
| 2,532,742 A | 12/1950 | Stoiner |
| 2,533,685 A | 12/1950 | Nurkiewicz |
| 2,574,028 A | 11/1951 | Fields et al. |
| 2,575,908 A | 11/1951 | Clifford |
| 2,579,977 A | 12/1951 | Sjolin |
| 2,600,239 A | 6/1952 | Gilbert |
| 2,605,560 A | 8/1952 | Gouabault |
| 2,622,052 A | 12/1952 | Chandler |
| 2,638,690 A | 5/1953 | Bullard, III |
| 2,677,904 A | 5/1954 | Reed |
| 2,677,906 A | 5/1954 | Reed |
| 2,678,506 A | 5/1954 | Baroumes |
| 2,682,712 A | 7/1954 | Owsen et al. |
| 2,686,081 A | 8/1954 | Cooksley |
| 2,693,221 A | 11/1954 | Lyijynen |
| 2,698,490 A | 1/1955 | Goldman |
| 2,717,100 A | 9/1955 | Engelder |
| 2,717,556 A | 9/1955 | Bartoo |
| 2,762,134 A | 9/1956 | Town |
| 2,774,152 A | 12/1956 | Alber |
| 2,775,401 A | 12/1956 | Storrs |
| 2,845,032 A | 7/1958 | Krohm |
| 2,860,634 A | 11/1958 | Duncan et al. |
| 2,863,230 A | 12/1958 | Cortina |
| 2,878,683 A | 3/1959 | Huthsing, Sr. et al. |
| 2,942,614 A | 6/1960 | Lardner |
| 2,949,927 A | 8/1960 | Mackal |
| 2,981,010 A | 4/1961 | Aaskov |
| 2,982,448 A | 5/1961 | Leonard et al. |
| 3,015,414 A | 1/1962 | Wilson |
| 3,027,659 A | 4/1962 | Gianola |
| 3,044,190 A | 7/1962 | Urbany |
| 3,062,152 A | 11/1962 | Huff, Sr. |
| 3,068,494 A | 12/1962 | Pinkwater |
| 3,078,679 A | 2/1963 | Mortimer et al. |
| 3,080,094 A | 3/1963 | Modderno |
| 3,120,712 A | 2/1964 | Menken |
| 3,180,039 A | 4/1965 | Burns, Jr. |
| D201,606 S | 7/1965 | McCord |
| 3,196,062 A | 7/1965 | Kristal |
| 3,211,164 A | 10/1965 | Bender et al. |
| 3,221,932 A | 12/1965 | Anderson |
| 3,225,463 A | 12/1965 | Burnham |
| 3,245,428 A | 4/1966 | Klimak et al. |
| 3,256,131 A | 6/1966 | Koch et al. |
| D205,276 S | 7/1966 | Kort |
| 3,273,263 A | 9/1966 | Klima |
| 3,329,983 A | 7/1967 | Clamp |
| 3,372,495 A | 3/1968 | Finn |
| 3,397,418 A | 8/1968 | Steadman et al. |
| 3,410,004 A | 11/1968 | Finn |
| 3,426,787 A | 2/1969 | Fuller |
| 3,484,881 A | 12/1969 | Krieger |
| D216,694 S | 3/1970 | Lause |
| 3,548,869 A | 12/1970 | Weise et al. |
| 3,586,003 A | 6/1971 | Baker |
| D221,432 S | 8/1971 | Dunlap |
| 3,628,531 A | 12/1971 | Harris |
| 3,642,563 A | 2/1972 | Davis et al. |
| 3,658,208 A | 4/1972 | Hansen |
| 3,664,043 A | 5/1972 | Polumbus, Jr. |
| 3,685,176 A | 8/1972 | Rudy |
| 3,716,930 A | 2/1973 | Brahm |
| 3,721,265 A | 3/1973 | Hoffland |
| 3,739,414 A | 6/1973 | Skelham |
| D227,888 S | 7/1973 | Felix |
| 3,744,159 A | 7/1973 | Nishimura |
| 3,760,056 A | 9/1973 | Rudy |
| 3,765,422 A | 10/1973 | Smith |
| 3,776,227 A | 12/1973 | Pitesky et al. |
| 3,791,375 A | 2/1974 | Pfeiffer |
| 3,834,433 A | 9/1974 | Thompson |
| 3,854,228 A | 12/1974 | Conroy |
| 3,888,242 A | 6/1975 | Harris et al. |
| 3,931,685 A | 1/1976 | Laukaitis |
| 3,973,336 A | 8/1976 | Ahn |
| 3,983,907 A | 10/1976 | Sorensen |
| 3,985,155 A | 10/1976 | Nightingale |
| 3,993,099 A | 11/1976 | Nightingale |
| 3,995,653 A | 12/1976 | Mackal et al. |
| 3,996,957 A | 12/1976 | Goldish et al. |
| D243,457 S | 2/1977 | Ryan |
| 4,014,048 A | 3/1977 | Rappleyea |
| 4,039,039 A | 8/1977 | Gottfried |

| | | | | | | |
|---|---|---|---|---|---|---|
| 4,044,867 A | 8/1977 | Fisher | | 4,669,498 A | 6/1987 | Hansen |
| 4,054,163 A | 10/1977 | Brown, Jr. et al. | | 4,670,995 A | 6/1987 | Huang |
| D246,486 S | 11/1977 | Nickel | | 4,676,010 A | 6/1987 | Cheskin |
| 4,069,602 A | 1/1978 | Kremer et al. | | 4,681,148 A | 7/1987 | Decker, Jr. et al. |
| 4,078,322 A | 3/1978 | Dalebout | | 4,694,520 A | 9/1987 | Paul et al. |
| 4,083,127 A | 4/1978 | Hanson | | 4,694,591 A | 9/1987 | Banich et al. |
| 4,088,147 A | 5/1978 | Krechel et al. | | 4,694,850 A | 9/1987 | Fumino |
| 4,100,686 A | 7/1978 | Sgarlato et al. | | 4,700,403 A | 10/1987 | Vacanti |
| 4,106,222 A | 8/1978 | Houck | | 4,702,022 A | 10/1987 | Porcher |
| D249,279 S | 9/1978 | Backlund | | 4,729,543 A | 3/1988 | Aricha |
| 4,123,855 A | 11/1978 | Thedford | | 4,730,403 A * | 3/1988 | Walkhoff .................. 36/117.8 |
| 4,129,951 A | 12/1978 | Petrosky | | 4,736,531 A | 4/1988 | Richard |
| D252,703 S | 8/1979 | Cupit | | 4,744,157 A | 5/1988 | Dubner |
| 4,168,015 A | 9/1979 | Robinette | | D296,581 S | 7/1988 | Hattori |
| 4,169,353 A | 10/1979 | Fresard | | 4,760,651 A | 8/1988 | Pon-Tzu |
| 4,183,156 A | 1/1980 | Rudy | | 4,763,426 A | 8/1988 | Polus et al. |
| 4,217,705 A | 8/1980 | Donzis | | 4,771,554 A | 9/1988 | Hannemann |
| 4,219,945 A | 9/1980 | Rudy | | 4,773,454 A | 9/1988 | Kroh et al. |
| 4,222,183 A | 9/1980 | Haddox | | 4,774,776 A | 10/1988 | Gulli |
| 4,232,459 A | 11/1980 | Vaccari | | 4,776,110 A | 10/1988 | Shiang |
| 4,271,606 A | 6/1981 | Rudy | | 4,778,595 A | 10/1988 | Sable et al. |
| 4,297,755 A | 11/1981 | Mollura | | 4,779,359 A | 10/1988 | Famolare, Jr. |
| 4,316,334 A | 2/1982 | Hunt | | D299,379 S | 1/1989 | Haggerty et al. |
| 4,316,335 A | 2/1982 | Giese et al. | | 4,805,601 A | 2/1989 | Eischen, Sr. |
| 4,335,530 A | 6/1982 | Stubblefield | | 4,811,497 A | 3/1989 | Merino Ciudad |
| 4,340,626 A | 7/1982 | Rudy | | 4,817,303 A | 4/1989 | Selbiger |
| 4,342,157 A | 8/1982 | Gilbert | | 4,823,482 A | 4/1989 | Lakic |
| 4,361,969 A | 12/1982 | Vermonet | | D302,764 S | 8/1989 | Peoples et al. |
| 4,370,997 A | 2/1983 | Braithwaite et al. | | 4,852,274 A | 8/1989 | Wilson |
| 4,372,297 A | 2/1983 | Perlin | | 4,854,057 A | 8/1989 | Misevich et al. |
| 4,397,104 A | 8/1983 | Doak | | 4,856,208 A | 8/1989 | Zaccaro |
| 4,398,357 A | 8/1983 | Batra | | RE33,066 E | 9/1989 | Stubblefield |
| 4,399,621 A | 8/1983 | Dassler | | 4,874,640 A | 10/1989 | Donzis |
| 4,417,407 A | 11/1983 | Fukuoka | | 4,877,057 A | 10/1989 | Christensen |
| 4,439,937 A | 4/1984 | Daswick | | 4,878,300 A | 11/1989 | Bogaty |
| 4,446,634 A | 5/1984 | Johnson et al. | | 4,887,367 A | 12/1989 | Mackness et al. |
| 4,454,662 A | 6/1984 | Stubblefield | | 4,906,502 A | 3/1990 | Rudy |
| 4,457,335 A | 7/1984 | Trick | | 4,910,889 A | 3/1990 | Bonaventure et al. |
| 4,458,429 A | 7/1984 | Schmid | | 4,912,861 A | 4/1990 | Huang |
| 4,458,430 A | 7/1984 | Peterson | | D307,508 S | 5/1990 | Miller et al. |
| 4,462,171 A | 7/1984 | Whispell | | 4,922,631 A | 5/1990 | Anderie |
| 4,485,568 A | 12/1984 | Landi et al. | | 4,934,543 A | 6/1990 | Schmidt |
| 4,489,855 A | 12/1984 | Boetger | | D309,211 S | 7/1990 | Nakagawa |
| 4,490,928 A | 1/1985 | Kawashima | | 4,969,493 A | 11/1990 | Lee |
| 4,506,695 A | 3/1985 | Kuypers | | D314,172 S | 1/1991 | Whitley, II |
| 4,508,582 A | 4/1985 | Fink | | 4,991,317 A * | 2/1991 | Lakic ........................... 36/44 |
| 4,535,554 A | 8/1985 | De Obaldia B. | | 4,995,124 A | 2/1991 | Wridge, Jr. et al. |
| 4,541,186 A | 9/1985 | Mulvihill | | 4,995,173 A | 2/1991 | Spier |
| 4,542,598 A | 9/1985 | Misevich et al. | | 4,999,072 A | 3/1991 | Dischler |
| 4,546,559 A | 10/1985 | Dassler | | 5,010,661 A | 4/1991 | Chu |
| 4,547,979 A | 10/1985 | Harada et al. | | 5,012,954 A | 5/1991 | Will |
| D281,350 S | 11/1985 | Heier | | 5,020,395 A | 6/1991 | Mackey |
| 4,550,510 A | 11/1985 | Stubblefield | | 5,022,565 A | 6/1991 | Sturman et al. |
| 4,571,853 A | 2/1986 | Medrano | | 5,025,575 A | 6/1991 | Lakic |
| 4,571,995 A | 2/1986 | Timme | | 5,042,176 A | 8/1991 | Rudy |
| 4,578,883 A | 4/1986 | Dassler | | 5,052,130 A | 10/1991 | Barry et al. |
| 4,579,141 A | 4/1986 | Arff | | 5,056,992 A | 10/1991 | Simons et al. |
| D284,264 S | 6/1986 | Resan | | 5,060,694 A | 10/1991 | Florida et al. |
| D284,265 S | 6/1986 | Resan | | 5,070,829 A | 12/1991 | Guntly et al. |
| D285,716 S | 9/1986 | Bova | | 5,074,765 A | 12/1991 | Pekar |
| 4,608,769 A | 9/1986 | Sturlaugson | | D323,419 S | 1/1992 | Brown et al. |
| 4,610,099 A | 9/1986 | Signori | | 5,083,320 A | 1/1992 | Halstead |
| 4,628,945 A | 12/1986 | Johnson, Jr. | | 5,083,581 A | 1/1992 | Jaw |
| 4,641,438 A | 2/1987 | Laird et al. | | 5,111,838 A | 5/1992 | Langston |
| 4,642,917 A | 2/1987 | Ungar | | 5,113,599 A | 5/1992 | Cohen et al. |
| 4,649,552 A | 3/1987 | Yukawa | | 5,121,840 A | 6/1992 | Schram |
| 4,651,445 A | 3/1987 | Hannibal | | D327,769 S | 7/1992 | Serna et al. |
| 4,654,986 A | 4/1987 | George | | 5,129,107 A | 7/1992 | Lorenzo |
| 4,658,869 A | 4/1987 | Soon-Fu | | 5,129,109 A | 7/1992 | Runckel |
| 4,662,087 A | 5/1987 | Beuch | | 5,131,173 A | 7/1992 | Anderie |
| 4,662,412 A | 5/1987 | Swallert | | 5,135,025 A | 8/1992 | Mackal |

| | | |
|---|---|---|
| D329,733 S | 9/1992 | Miller et al. |
| 5,144,708 A | 9/1992 | Pekar |
| 5,155,864 A | 10/1992 | Walker et al. |
| 5,155,865 A | 10/1992 | Walker et al. |
| 5,155,866 A | 10/1992 | Walker et al. |
| 5,155,927 A | 10/1992 | Bates et al. |
| 5,158,767 A | 10/1992 | Cohen et al. |
| 5,181,279 A | 1/1993 | Ross |
| 5,185,943 A | 2/1993 | Tong et al. |
| 5,191,727 A | 3/1993 | Barry et al. |
| 5,195,254 A | 3/1993 | Tyng |
| 5,230,249 A | 7/1993 | Sasaki et al. |
| 5,234,015 A | 8/1993 | Fumino |
| 5,243,772 A | 9/1993 | Francis et al. |
| 5,253,435 A | 10/1993 | Auger et al. |
| D341,189 S | 11/1993 | Legassie et al. |
| 5,295,313 A | 3/1994 | Lee |
| 5,313,717 A | 5/1994 | Allen et al. |
| 5,317,819 A | 6/1994 | Ellis, III |
| 5,319,866 A | 6/1994 | Foley et al. |
| 5,343,638 A * | 9/1994 | Legassie et al. ............... 36/29 |
| 5,351,710 A * | 10/1994 | Phillips ...................... 137/223 |
| 5,353,525 A * | 10/1994 | Grim ............................. 36/88 |
| 5,375,345 A | 12/1994 | Djuric |
| 5,381,607 A | 1/1995 | Sussmann |
| 5,390,430 A | 2/1995 | Fitchmun et al. |
| 5,392,534 A | 2/1995 | Grim |
| 5,400,526 A | 3/1995 | Sessa |
| 5,406,661 A | 4/1995 | Pekar |
| 5,406,719 A | 4/1995 | Potter |
| 5,408,760 A | 4/1995 | Tse et al. |
| 5,544,429 A | 8/1996 | Ellis, III |
| 5,701,687 A | 12/1997 | Schmidt et al. |
| 5,784,807 A * | 7/1998 | Pagel ............................ 36/93 |
| 5,806,208 A | 9/1998 | French |
| 5,826,349 A | 10/1998 | Goss |
| 5,829,172 A | 11/1998 | Kaneko |
| 5,832,634 A | 11/1998 | Wong |
| 5,893,219 A | 4/1999 | Smith et al. |
| 5,915,820 A | 6/1999 | Kraeuter et al. |
| 5,987,779 A * | 11/1999 | Litchfield et al. .............. 36/29 |
| 6,014,823 A * | 1/2000 | Lakic ............................ 36/93 |
| 6,161,240 A * | 12/2000 | Huang ........................... 5/710 |
| 6,195,914 B1 | 3/2001 | Otis |
| 6,553,691 B2 | 4/2003 | Huang |

FOREIGN PATENT DOCUMENTS

| | | |
|---|---|---|
| CA | 1230225 | 3/1986 |
| DE | 352167 | 4/1922 |
| DE | 820869 | 11/1951 |
| DE | 867585 | 2/1953 |
| DE | 917173 | 8/1954 |
| DE | 2005365 | 9/1970 |
| DE | 2321817 | 11/1973 |
| DE | 2308547 | 8/1974 |
| DE | 2365329 | 9/1974 |
| DE | 2456612 | 6/1975 |
| DE | 2800359 | 7/1979 |
| DE | 2845824 | 11/1980 |
| DE | 3245182 | 5/1983 |
| DE | 3205264 | 8/1983 |
| DE | 3427644 | 1/1986 |
| DE | 8802338 | 8/1989 |
| EP | 40189 | 11/1981 |
| EP | 152401 | 8/1985 |
| EP | 184781 | 6/1986 |
| EP | 229273 | 7/1987 |
| EP | 352807 | 1/1990 |
| EP | 389215 | 9/1990 |
| EP | 472110 | 2/1992 |
| EP | 629360 | 12/1994 |
| EP | 630592 | 12/1994 |
| FR | 601166 | 4/1926 |
| FR | 720257 | 2/1932 |
| FR | 1204093 | 1/1960 |
| FR | 2026062 | 9/1970 |
| FR | 2180315 | 11/1973 |
| FR | 2252820 | 6/1975 |
| FR | 2356384 | 1/1978 |
| FR | 2484215 | 12/1981 |
| FR | 2496423 | 6/1982 |
| GB | 14955 | 5/1894 |
| GB | 26637 | 7/1897 |
| GB | 23547 | 1/1900 |
| GB | 288671 | 9/1927 |
| GB | 338266 | 6/1930 |
| GB | 520514 | 12/1939 |
| GB | 817521 | 7/1959 |
| GB | 887832 | 1/1962 |
| GB | 2039717 | 8/1980 |
| GB | 2114425 | 8/1983 |
| GB | 2114869 | 9/1983 |
| GB | 2165439 | 4/1986 |
| GB | 2240254 | 7/1991 |
| GB | 2271710 | 4/1994 |
| JP | 1-164804 | 6/1989 |
| TW | 95419 | 2/1988 |
| WO | 87/03789 | 7/1987 |
| WO | 89/10074 | 11/1989 |
| WO | 90/04323 | 5/1990 |
| WO | 91/16830 | 11/1991 |
| WO | 91/18527 | 12/1991 |
| WO | 93/14659 | 8/1993 |
| WO | 93/21790 | 11/1993 |

OTHER PUBLICATIONS

Runner's World, pp. 58–59, 69 and 74 (Apr. 1991).
Running Times, pp. 23 and 26 (Apr. 1991).
Innovations in Cycling, Inc., Interbike Buyer Official Show Guide, 10th Ann. Interbike 1991 Int'l. Bicycle Expo.
Mega MicroBlast CO.sub.2 Air Dispenser, Date Unknown.

* cited by examiner

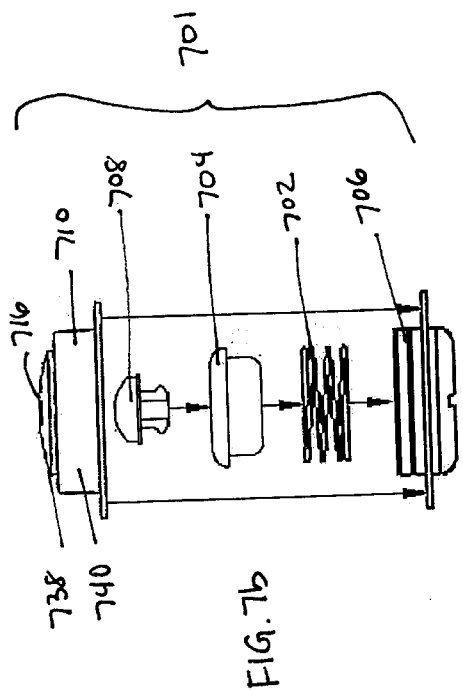
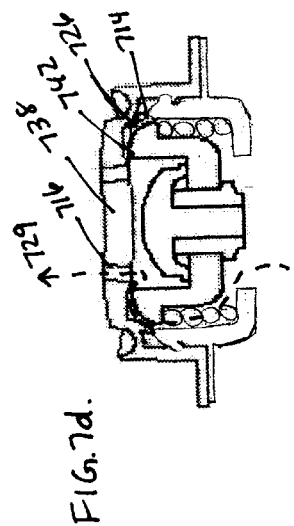
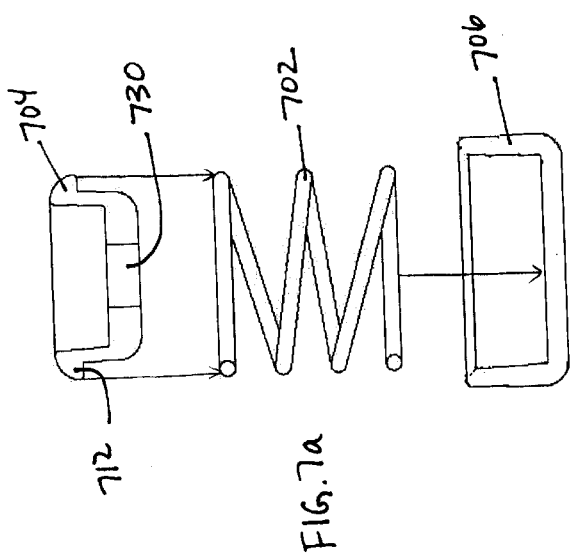
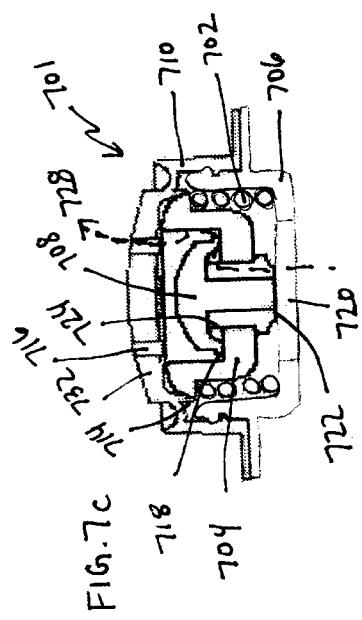

SHOE HAVING AN INFLATABLE BLADDER

BACKGROUND OF THE INVENTION

1. Field of the Invention

This invention relates to footwear, and more particularly to an athletic shoe having an inflatable bladder.

2. Background Art

Athletic footwear must provide stable and comfortable support for the body while subject to various types of stress. It is important that the shoe be comfortable and provide support during various foot movements associated with athletic activity.

Articles of footwear typically include an upper and a sole, and are sold in a variety of sizes according to the length and width of the foot. However, even feet of similar length do not have the same geometry. Therefore, a conventional upper must be adjustable to provide support to various foot contours. Many different products and designs have focused on the need for adjustable upper support. For example, the upper may include an ankle portion which encompasses a portion of the ankle region of the foot and thereby provides support thereto.

In addition, it is well known to adjust the size of a shoe through lacing or through one or more straps reaching across the throat of a typical shoe. Lacing alone, however, suffers from several disadvantages, for example, when the shoe laces or strap is drawn too tightly, the fastening system can cause pressure on the instep of the foot. Such localized pressure is uncomfortable to the wearer and can make it difficult for the shoe to be worn for prolonged periods of time. Furthermore, while lacing allows the upper of the shoe to be adjustable to accommodate varying foot and ankle configurations, it does not mold the shoe to the contour of individual feet. Moreover, there are areas of the foot which are not supported by the upper, due to the irregular contour of the foot. The ski boot industry has often resorted to using inflatable insertable devices to improve the fit of the boots without the pressure caused by lacing.

One of the problems associated with shoes has always been striking a balance between support and cushioning. Throughout the course of an average day, the feet and legs of an individual are subjected to substantial impact forces. Running, jumping, walking and even standing exert forces upon the feet and legs of an individual which can lead to soreness, fatigue, and injury.

The human foot is a complex and remarkable piece of machinery, capable of withstanding and dissipating many impact forces. The natural padding of fat at the heel and forefoot, as well as the flexibility of the arch, help to cushion the foot. An athlete's stride is partly the result of energy which is stored in the flexible tissues of the foot. For example, during a typical walking or running stride, the achilleas tendon and the arch stretch and contract, storing energy in the tendons and ligaments. When the restrictive pressure on these elements is released, the stored energy is also released, thereby reducing the burden which must be assumed by the muscles.

Although the human foot possesses natural cushioning and rebounding characteristics, the foot alone is incapable of effectively overcoming many of the forces encountered during athletic activity. Unless an individual is wearing shoes which provide proper cushioning and support, the soreness and fatigue associated with athletic activity is more acute, and its onset accelerated. This results in discomfort for the wearer which diminishes the incentive for further athletic activity. Equally important, inadequately cushioned footwear can lead to injuries such as blisters, muscle, tendon and ligament damage, and bone stress fractures. Improper footwear can also lead to other ailments, including back pain.

In light of the above, numerous attempts have been made over the years to incorporate into a shoe a means for providing improved cushioning and resiliency to the shoe. For example, attempts have been made to enhance the natural elasticity and energy return of the foot with foams such as EVA, which tend to break down over time and lose their resiliency, or with fluid-filled inserts. Fluid filled devices attempt to enhance cushioning and energy return by containing pressurized fluid disposed adjacent the heel and forefoot areas of a shoe. Several overriding problems exist with these devices.

One of these problems is that often fluid filled devices are not adjustable for physiological variances between people and the variety of activities for which athletic shoes are warn. It has been known to adjust fluids in the sole of footwear, such as in U.S. Pat. No. 4,610,099 to Signori. However, under foot devices, while providing cushioning to the sole, typically do not aid in support for the sides, top and back of the foot. Attempts to cushion the upper and sole of a shoe with air have resulted in products that are either ineffective or, because of the construction techniques used, are too heavy and cumbersome to be used for a running shoe.

For example, U.S. Pat. No. 5,113,599 discloses an article of footwear having an inflatable bladder under the foot as well as around the sides and back of the foot. In conventional underfoot cushioning systems, when the heel contacts the ground during the gait cycle, fluid is transferred from the heel area of the foot and displaced to the forefoot area of the foot, causing the pressure in the forefoot area to increase. Because the underfoot portion of an inflatable bladder is typically separate from the portions of an inflatable bladder along the sides and top of the foot, downward pressure in the heel of a conventional cushioning device has no effect on the cushioning surrounding the sides and heel of a foot.

Conventional inflatable shoe inserts are also designed to be used in conjunction with a conventional shoe upper. A shoe with this type of design can be quite expensive because it requires all the materials of the upper and the additional materials of the inflatable insert. Often the inflatable inserts also add bulk to the shoe because they require a system of complex tubing between the inflation mechanism and the inflatable bladder. With the presence of an upper to completely surround the foot, there is no need for the inflation inserts to completely surround the foot. Conventional inserts may only support certain regions of the foot.

Most conventional inflatable shoes include either a hand-held inflation mechanism, e.g., that described in Brazilian Patent No. 8305004 to Signori, or an on-board inflation mechanism which is used to selectively inflate only a portion of a shoe. Other inflatable shoes are pre-inflated at the factory. Whether inflated at the factory or inflated by the user, there is a problem with diffusion of air out of the shoe. In the case of shoes inflated at the factory, the problem of diffusion has been partially solved by utilizing a large molecule gas as the fluid for inflating the shoe. While the large molecule gas does not diffuse at the same rate as air, the gas is more expensive which increases the costs of the shoe, and a user is not capable of varying the amount of pressure in the shoe to his individual preferences.

Accordingly, what is needed is a shoe which includes one continuously fluidly interconnected inflatable bladder, wherein fluid may flow between the underside of the foot to the medial and lateral sides of the foot without the need for complex tubing. The footwear must be securely fitted and fastened to the foot of the wearer, whereby a comfortable but secure grip is assured around the ankle and around the instep of the wearer. Further, the bladder in the athletic shoe must be lightweight, inexpensive, self-contained, and easy to use. In addition, the shoe should be easily constructed with minimum required stitching.

BRIEF SUMMARY OF THE INVENTION

The present invention is generally an article of footwear having a sole, and an upper. The upper has an outer surface and an inner surface. At least a portion of either the outer surface or the inner surface or both is formed from an inflatable bladder. The bladder is inflated by an inflation mechanism. The inflation mechanism is located in such a manner that the downward pressure of a user's foot causes the operation of the inflation mechanism. The bladder is made from two sheets of urethane film which are welded together. Alternatively, the bladder can be formed from a laminate, such as a film and cloth laminate.

The inflatable bladder includes a sole compartment, a medial compartment, and a lateral compartment. The sole compartment extends under the foot of a wearer and is further divided into at least a first compartment and a second compartment. The first compartment is fluidly connected and adjacent to the medial compartment and the second compartment is fluidly connected to and adjacent the lateral compartment, such that the medial side and lateral side of the bladder are attached under the foot of the wearer. However, the first compartment and the second compartment are not directly fluidly connected and are separated by a periphery weld line. The first compartment and the second compartment are permanently attached under the foot, such as by the used of stitching in the margin of the bladder. Consequently, the bladder forms a continuous cushion running from one side of an inserted foot, under the foot, to a second side of the foot.

The bladder further includes an heel portion fluidly connected and adjacent to both the medial compartment and the lateral compartment. The heel portion is permanently attached to the sole compartment, such that the bladder forms a boot surrounding a heel of a foot when inserted into said shoe.

The first compartment generally includes an arch compartment, while the second compartment generally includes a heel compartment. The second compartment also includes a midfoot compartment, which may be fluidly connected to one of the heel compartment, the medial compartment or the lateral compartment. The second compartment further includes a forefoot compartment, which may also be fluidly connected to one of the midfoot compartment, the medral compartment or the lateral compartment.

In another embodiment, the first compartment is a forefoot compartment, and the second compartment includes a heel compartment and a midfoot compartment, such that the midfoot compartment may be fluidly connected to one or more of the heel compartment, the lateral compartment and the medial compartment.

The article of footwear may include a release valve, which communicates between said bladder and the ambient atmosphere. With the release valve, a user can reduce the amount of air in said bladder manually. Alternatively, the article of footwear may include a check valve, whereby the pressure in said bladder is automatically released. In another embodiment, a combination check valve and release valve may be used in the present invention. A combination check valve and release valve is made from a cap; a seating forming an air-tight seal with the cap; a check valve forming another air-tight seal with the seating. A downward pressure on the cap causes a separation between said seating and said cap releasing the airtight seal between the cap and the seating.

The underfoot inflation mechanism defines a hole which acts as a one-way valve to enable air to be introduced into said inflation mechanism. Generally, the inflation mechanism is located substantially under the heel of the foot and includes a foam insert to help maintain the volume of the inflation mechanism. More than one underfoot inflation mechanism may be used in the present invention. An underfoot inflation mechanism may be disposed within a cavity formed in the top surface of a foam midsole.

BRIEF DESCRIPTION OF THE DRAWINGS/ FIGURES

The foregoing and other features and advantages of the present invention will be apparent from the following, more particular description of a preferred embodiment of the invention, as illustrated in the accompanying drawings in which:

FIG. 4 is a top view of an alternate embodiment of the bladder;

FIG. 7a is an exploded view of the spring mechanism of a blow off valve;

FIG. 7b is an exploded view of a combination check valve and release valve;

FIG. 7c is a cross section of a combination release valve and check valve; and

FIG. 7d is a cross section of a combination release valve and check valve which the release valve function operating.

DETAILED DESCRIPTION OF THE INVENTION

Figure 1:
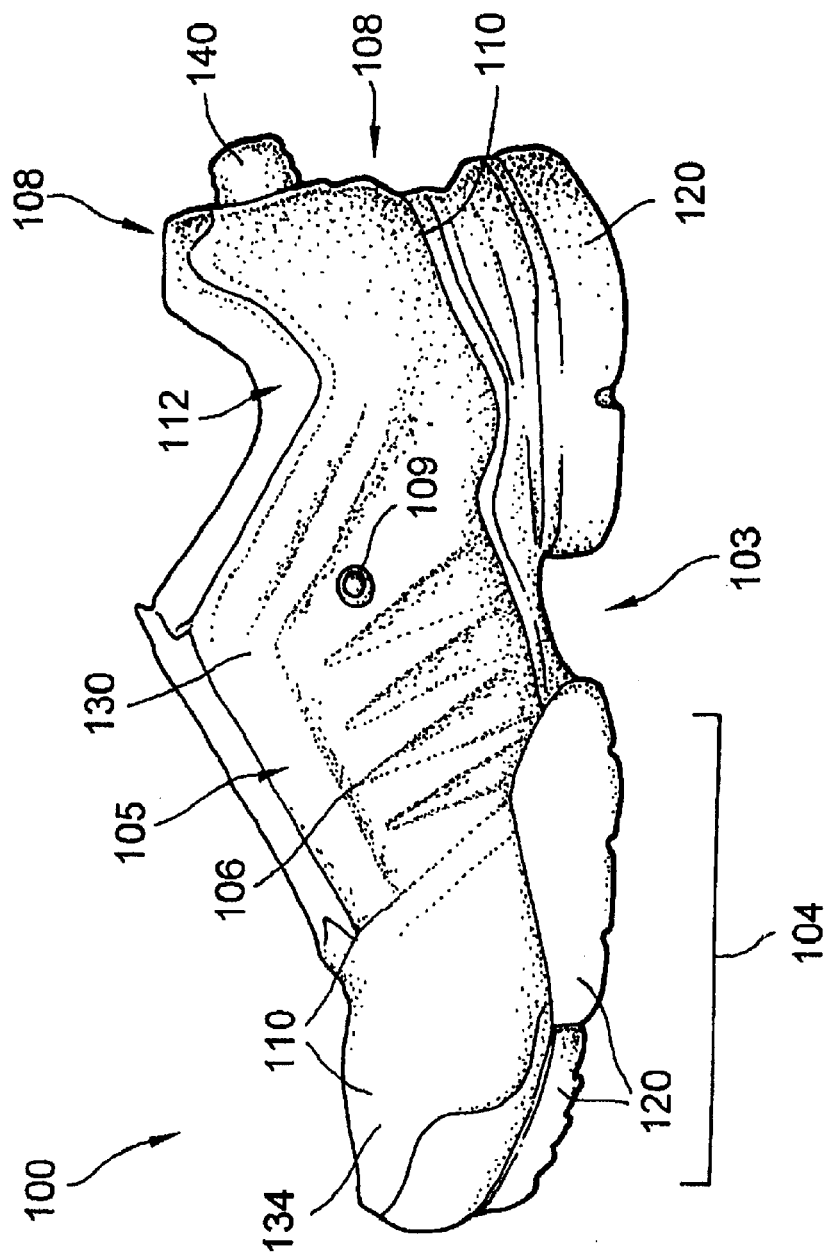
FIG. 1 is a lateral side of a shoe incorporating the present invention.

A preferred embodiment of the present invention is now described with reference to the Figures, in which like reference numerals are used to indicate identical or functionally similar elements. Also in the Figures, the left most digit of each reference numeral corresponds to the Figure in which the reference numeral first appears. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in other applications.

A shoe for a right foot according to the present invention is shown generally at 100 in FIG. 1. A corresponding shoe for the left foot could be a mirror image of shoe 100 and therefore, is not shown or described herein. As shown in FIG. 1, shoe 100 has a heel area shown generally at 108, an arch area shown generally at 103, a vamp area shown generally at 105, a forefoot area shown generally at 104, and a medial side area generally shown at 106. The present invention does not necessitate a conventional leather or cloth upper, particularly with the additional foam padding found along the interior of a typical athletic shoe upper. Therefore, shoe 100 includes a sole 120 and an upper 110 of which at least a portion entirely comprises an inflatable bladder 130. In addition, upper 110 of FIG. 1 has a toe portion 134. As demonstrated in FIG. 1, toe portion 134 need not be constructed from bladder 130. However, in alternative embodiments, bladder 130 may form any or all portions of upper 110, including toe portion 134. Upper 110 has an opening shown generally at 112, which is designed to receive a wearer's foot.

In order for a wearer to customize the amount of air in the bladder at any time, bladder 130 is in communication with an inflation mechanism. In an embodiment shown in FIG. 1, a generic inflation mechanism 140 is attached to bladder 130 in the heel area of the shoe. However, in alternate embodiments, inflation mechanism 140 may be located on the tongue of the shoe, on the sole of the shoe, on the side of the shoe, or any other area of the shoe as would be apparent to one skilled in the relevant art. For example, another embodiment comprising an inflation mechanism on the tongue will be later discusses with reference to FIG. 2.

A variety of different inflation mechanisms can be utilized in the present invention. The inflation mechanism may be, for example, a simple latex bulb which is physically attached to the shoe. Alternatively, the inflation mechanism may be a molded plastic chamber as shown in FIG. 1 or may be a hand held pump such as one which utilizes $CO_2$ gas to inflate a bladder.

Finally, as will be described with reference to FIG. 3 and FIG. 5, a portion of the bladder can be isolated from the remainder of the bladder. This isolated portion fluidly communicates with the remainder of the bladder via a one-way valve. This one-way valve allows the isolated portion to act as an inflation mechanism. Having an isolated portion of the bladder act as an inflation mechanism is preferably suitable for an underfoot bladder so as to automatically inflate the bladder as a user engaged in activity. However such an inflation mechanism may be used on any portion of the shoe.

Preferably, the inflation mechanism is small, lightweight, and provides a sufficient volume of air such that only little effort is needed for adequate inflation. For example, U.S. Pat. No. 5,987,779, which is incorporated by reference, describes an inflation mechanism comprising a bulb (of various shapes) with a one-way check valve. When the bulb is compressed air within the bulb is forced into the desired region. As the bulb is released, the check valve opens because of the pressure void in the bulb, allowing ambient air to enter the bulb.

Another inflation mechanism, also described in U.S. Pat. No. 5,987,779, incorporated herein by reference, is a bulb having a hole which acts as a one-way valve. A finger can be placed over the hole in the bulb upon compression. Therefore, the air is not permitted to escape through the hole and is forced into the desired location. When the finger is removed, ambient air is allowed to enter through the hole. An inflation mechanism having collapsible walls in order to displace a greater volume of air may be preferred. A similar inflation mechanism may include a temporarily collapsible foam insert. This foam insert ensures that when the bulb is released, the bulb expands to the natural volume of the foam insert drawing in air to fill that volume. A preferred foam is a polyurethane or polyether foam, such as the 4.25–4.79 pound per cubic foot polyether polyurethane foam, part number FS-170-450TN, available from Woodbridge Foam Fabricating, 1120-T Judd Rd., Chattanooga, Tenn., 37406.

U.S. Pat. No. 6,287,225, incorporated herein by reference, describes another type of on-board inflation mechanism suitable for the present invention. One skilled in the art can appreciate that a variety of inflation mechanisms are suitable for the present invention. In addition, any inflation mechanism is appropriate for use with any embodiments of the present invention.

The inflation mechanism shown in FIG. 1 is an accordion style inflation mechanism comprising a plastic, collapsible case. Air enters through a hole open to the exterior of the inflation mechanism. The inflation mechanism operates similar to that described above with respect to the bulb inflation mechanism except that the casing is collapsed accordion-style to increase the amount of air forced into the system. Upon release, the accordion-style casing expands and the air is forced into the casing to regulate the pressure within the casing.

These inflation mechanisms all require a one-way valve be placed between the inflation mechanism and the bladder 130, so that once air enters the system it may not travel backwards into the inflation mechanism. Various types of one-way valves are suitable for use in conjunction with the various inflation mechanisms of the present invention. Preferably, the valve will be relatively small and flat for less bulkiness. U.S. Pat. No. 5,144,708 to Pekar, incorporated herein by reference, describes a valve suitable for the present invention. The patent describes a valve formed between thermoplastic sheets. The valve described in the Pekar patent allows for simple construction techniques to be used whereby the valve can be built into the system at the same time the bladder is being welded. One skilled in the art would understand that a variety of suitable valves are contemplated in the present invention.

The one-way valve provides a method to avoid over inflation of the system. In particular, if the pressure in the bladder is equal to the pressure exerted by the inflation mechanism, no additional air will be allowed to enter the system. In fact, when an equilibrium is reached between the pressure in the bladder and the pressure of the compressed inflation mechanism, the one-way valve which opens to allow air movement from the inflation mechanism to the bladder 130 may remain closed. Even if this valve does open, no more air will enter the system. Any one-way valve will provide a similar effect, as would be known to one skilled in the art. In addition, any one-way valve would be appropriate for use in any embodiments of the present invention.

One embodiment, as seen in FIG. 1, may include a deflation valve 109. The particular deflation valve in FIG. 1 is a release valve. A release valve is fluidly connected to bladder 130 and allows the user to personally adjust the amount of air inserted into bladder 130, particularly if the preferred comfort level is less than the pressure limits otherwise provided by the bladder. The release valve can comprise any type of release valve. One type of release valve is the plunger-type described in U.S. Pat. No. 5,987,779, incorporated herein by reference, wherein the air is released upon depression of a plunger which pushes a seal away from the wall of the bladder allowing air to escape. In particular, a release valve may have a spring which biases a plunger in a closed position. A flange around the periphery of the plunger can keep air from escaping between the plunger and a release fitting because the flange is biased in the closed position and in contact with the release fitting. To release air from bladder 130, the plunger is depressed by the user. Air then escapes around the stem of the plunger. This type of release valve is mechanically simple and light weight. The components of a release valve may be made out of a number of different materials including plastic or metal. Any release valve is appropriate for use in any embodiment of the present invention.

FIG. 1 shows one possible location of deflation valve 109 on shoe 100. However deflation valve 109 may be positioned in any number of different locations provided that it is fluidly connected with bladder 130, as would be apparent to one skilled in the relevant art. Additionally, shoe 100 may include more than one deflation valve.

As an alternative, deflation valve 109 may also act as a check valve, or blow off valve, which will open when the pressure in bladder 130 is at or greater than a predetermined level. In each of these situations, bladder 130 will not inflate over a certain amount no matter how much a user attempts to inflate the shoe.

One type of check valve has a spring holding a movable seating member against an opening in the bladder. When the pressure from the air inside the bladder causes a greater pressure on the movable seating member in one direction than the spring causes in the other direction, the movable seating member moves away from the opening allowing air to escape the bladder. In addition, any other check valve is appropriate for use in the present invention, as would be apparent to one skilled in the art. For example, the VA-3497 Umbrella Check Valve (Part No. VL1682-104) made of Silicone VL1001M12 and commercially available from Vernay Laboratories, Inc. (Yellow Springs, Ohio, USA) may be a preferred check valve. Further, any check valve would be appropriate for use in any embodiment of the present invention.

In another embodiment, deflation valve 109 may be adjustable check valve wherein a user can adjust the pressure at which a valve is released. An adjustable check valve has the added benefit of being set to an individually preferred pressure rather than a factory predetermined pressure. An adjustable check valve may be similar to the spring and movable seating member configuration described in the preceding paragraph. To make it adjustable, however, the valve may have a mechanism for increasing or decreasing the tension in the spring, such that more or less air pressure, respectively, would be required to overcome the force of the spring and move the movable seating member away from the opening in the bladder. However, any type of adjustable check valve is appropriate for use in the present invention, as would be apparent to one skilled in the art, and any adjustable check valve would be appropriate for use in any embodiment of the present invention.

Bladder 130 may include more than one type of deflation valve 109. For example, bladder 130 may include both a check valve and a release valve. Alternatively, bladder 130 may contain a deflation valve 109 which is a combination release valve and check valve. This type of valve is described in detail below with respect to FIGS. 7a–7d.

In one embodiment, small perforations may be formed in the bladder to allow air to naturally diffuse through the bladder when a predetermined pressure is reached. The material used to make bladder 130 may be of a flexible material such that these perforations will generally remain closed. If the pressure in the bladder becomes greater than a predetermined pressure the force on the sides of the bladder will open the perforation and air will escape. When the pressure in bladder 130 is less than this predetermined pressure, air will escape very slowly, if at all, from these perforations. Any embodiment of a bladder of the present invention may also have these perforations for controlling the amount of air within the bladder.

Bladder 130 may be formed from an exterior layer or film and a coextensive interior layer or film. The bladder may be shaped in a variety of configuration, such as that shown for bladder 230 in FIG. 2. The interior and exterior layers may be a lightweight urethane film such as is available from J. P. Stevens & Co., Inc., Northampton, Mass. as product designation MP1880. Alternatively, the layers may be thin films of ethyl vinyl acetate or a similar barrier film. The interior layer and the exterior layer may also be formed from different materials. In addition, the exterior layer may be a laminate formed from the combination of a urethane film and a thin fabric attached thereto.

The interior layer is attached to the exterior layer along air-tight periphery weld lines 210. The periphery weld lines 210 attach the exterior layer to the interior layer and create a barrier to keep air between the layers. One example of a suitable method of attachment of the exterior layer to the interior layer is the application of high radio frequency (RF welding) to the edges of the first and second film. The exterior and interior layers may alternatively be heat welded or ultrasonic welded together or attached by any other air tight means. Interior weld lines 220 are also provided. These interior welded lines 220 are also formed by RF welding, heat welding, ultrasonic welding or by other suitable means, and form the compartments of the present invention discussed in detail below. The exterior layer and interior layer are only attached along the periphery weld lines 210 and the interior weld lines 220. Consequently, a pocket or bladder is formed which allows a fluid, such as air, another gas or a liquid, to be introduced between the exterior layer and the interior layer. The sheets are welded together along all the weld lines and then die cut to form the predetermined shape.

Since bladder 130 forms at least a portion of an exterior and/or an interior surface of upper 110, as seen in an embodiment of FIG. 1, a bladder of the present invention may also be formed with a thin layer of external material bonded or laminated to one or both of the exterior and interior layers. The bonding can occur either before or after the formation of the bladder. One suitable material is LYCRA® (available from DuPont). LYCRA® is a flexible and breathable material. Alternatively, one or both of the exterior and interior layers may be bonded to a foam laminate, any type of synthetic material, or any other material that would be available to one skilled in the art, or that is typically used in the production of a shoe. In a preferred embodiment, the bladder with or without the bonded material forms a portion of both the exterior and the interior of the shoe.

Returning to FIG. 2, bladder 230 includes a plurality of compartments including medial compartment 254, lateral compartment 256, medial heel compartment 259, lateral heel compartment 258, and sole compartments designated arch compartment 252, heel compartment 260, midfoot compartment 262 and forefoot compartment 264. Those compartments disposed on the medial side of the shoe are fluidly connected to those compartments disposed on the lateral side of the shoe via fluid connection junction 274 located in the achilleas tendon portion of the shoe. In the embodiment shown in FIG. 2, inflation mechanism 208 is fluidly connected to medial compartment 254 and fluidly connected via passageway 272 to the medial heel compartment 259. Medial compartment 254 provides cushioning to the medial side of the foot and is fluidly interconnected to arch compartment 252 which provides cushioning under the arch of the foot. Medial compartment 254 is also fluidly connected to medial heel compartment 259 via passageway 276 and to lateral heel compartment 258 via connection junction 274, providing cushioning around heel area 108. Lateral heel compartment 258 is fluidly connected to lateral compartment 256 via passageway 278 which provides cushioning along the lateral side of the foot.

Lateral compartment 256 is fluidly connected to heel compartment 260 which provides cushioning to the heel of the foot. Heel compartment 260 is also fluidly connected to connection junction 274 through passageway 280. Heel compartment 260 is fluidly interconnected to midfoot compartment 262 and forefoot compartment 260.

Figure 2:
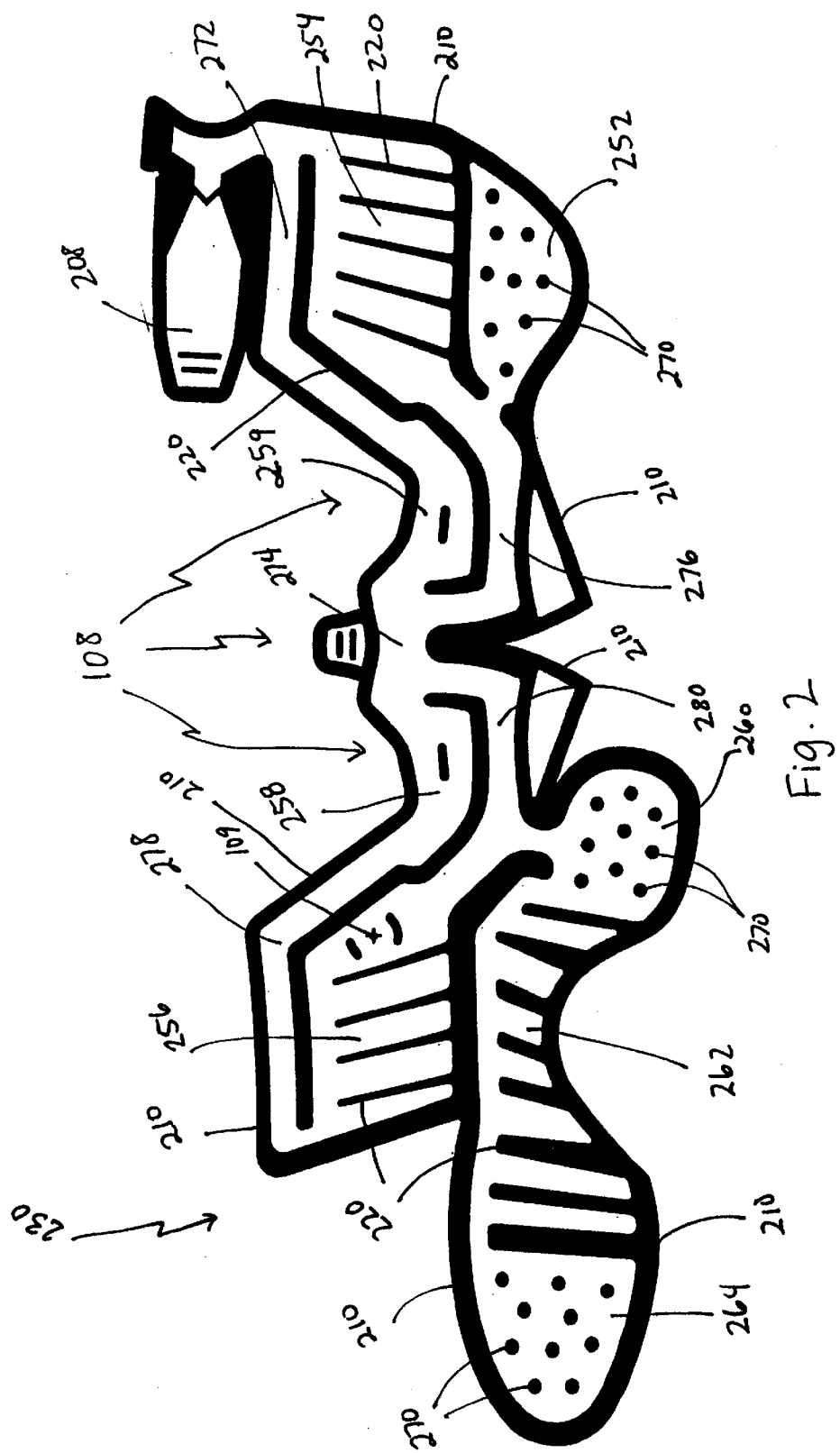
FIG. 2 is a top view of a bladder of the present invention.

As shown in FIG. 2, medial compartment 254, lateral compartment 256, midfoot compartment 262, lateral heel compartment 258, and medial heel compartment 259 are further compartmentalized. This allows shoe 100 and bladder 230 to easily flex and further conform to a user's foot.

The bladder shown in FIG. 2 provides cushioning and a custom fit to the entire foot, including the sides of the foot. This increases the comfort of the wearer. Further, because the compartments located on the sides of the foot are fluidly connected to the different compartments located underneath the foot, air can flow to both sides of the shoe when the compartments located underneath the foot are under compression. Although bladder 230 is shown with lateral compartment 256 being fluidly connected to heel compartment 260 and medial compartment 254 being fluidly connected to arch compartment 252, it would be apparent to one skilled in the relevant art that any of the compartments located along the side and heel of the foot could be fluidly connected to any one of the compartments located beneath the foot to allow air to transfer from the bottom of the shoe to the sides of the shoe and vice versa. Furthermore, in alternate embodiments bladder 230 could include fewer or greater numbers of compartments, and the compartments of bladder 230 may be any size or shape, as would be apparent to one skilled in the relevant art.

In a preferred embodiment, bladder 230 may include welds 270, such as those shown in forefoot compartment 264, heel compartment 260 and arch compartment 252. Welds 270 are used to control the thickness of the bladder when the bladder is in its filled configuration (e.g., air has been pumped into the bladder). Welds 270 are also formed by RF welding, heat welding, ultrasonic welding or by other suitable means. In regions of the bladder where it is desirable to have bladder 230 inflated to a minimal thickness, the density of circular welds 270 may be greater than the areas where it is permissible or desirable for bladder 130 to be inflated to a greater thickness. These welds may be circular or any other geometry, such as triangular, oval or square, provided that they are shaped to limit and control the inflation dimensions of the bladder of the present invention.

As shown in FIG. 2, deflation valve 109 may be located in lateral compartment 256 of bladder 230, and inflation mechanism 208 may be fluidly connected to medial compartment 254. However, in alternate embodiments, inflation mechanism 208 and deflation valve 109 may be located in any area of bladder 230, which would be apparent to one skilled in the relevant art, or absent altogether. FIG. 2 shows an elongated inflation mechanism, which may fit more conveniently along a tongue portion of a shoe than a rounded bulb or an accordion style inflation mechanism. As stated earlier, any type of inflation mechanism is suitable for use in the present invention, as would be clear to one skilled in the art. Similarly all types of deflation valves described, above, with reference to bladder 130 may be used in an embodiment such as bladder 230. Bladder 230 may also use perforations or one-way valves to control the amount of air in bladder 230, as described above.

Figure 3:
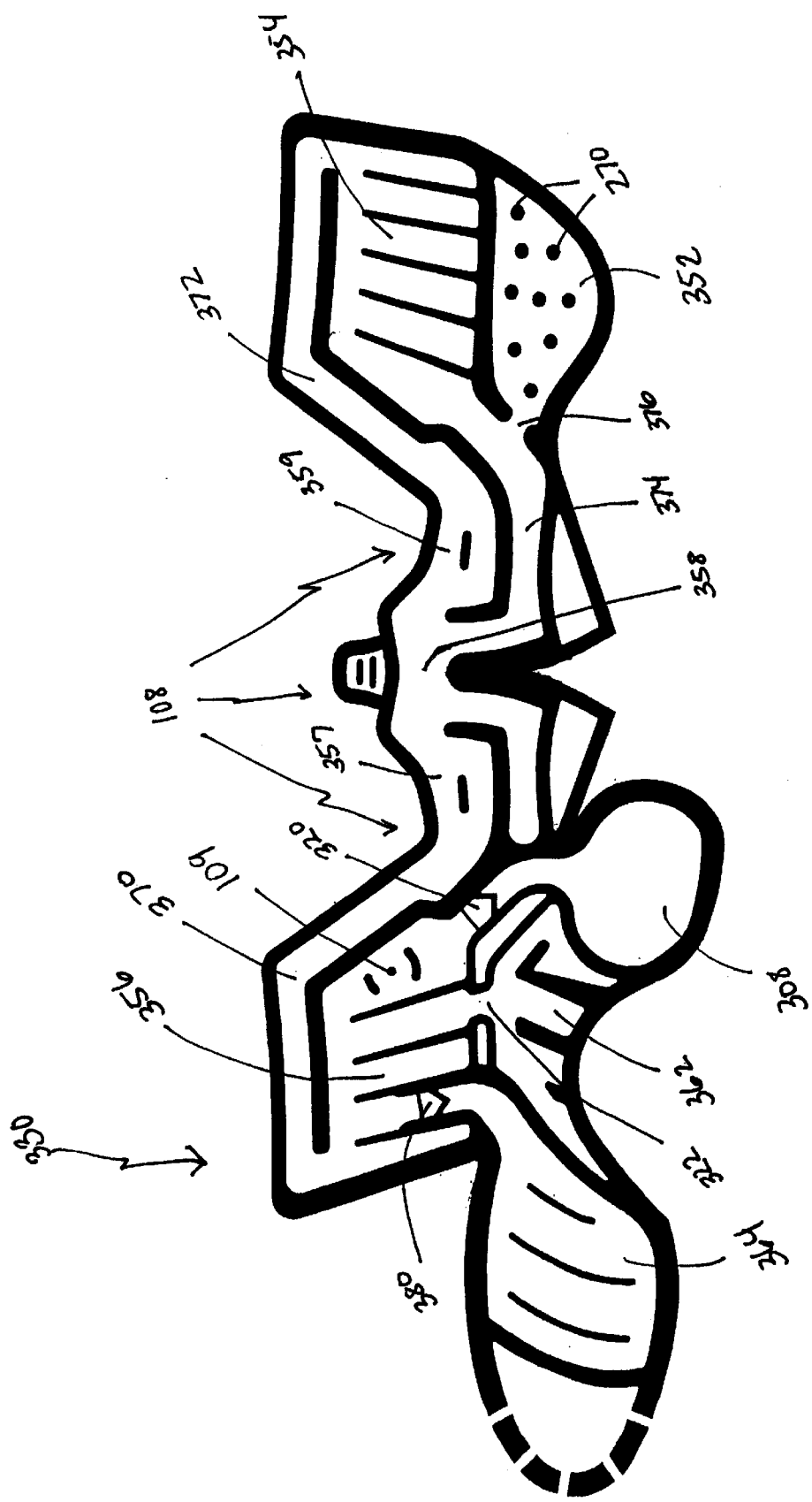
FIG. 3 is a top view of an alternate embodiment of the bladder.

FIG. 3 shows an alternate embodiment of a bladder 330, wherein heel compartment 308 acts as an inflation mechanism under the heel area of the foot. A hole may be located in heel compartment 308 so that, with each step that is taken, the hole is sealed shut and the air located in heel compartment 308 is forced through one-way valve 320 into lateral compartment 356 and on through the rest of bladder 330. The downward pressure from the heel against the hole creates an air tight seal so that the air in heel compartment 308 is forced through the one-way valve. One-way valve 320 will allow fluid to flow only in the direction opposite the direction of the arrow in FIG. 3. As the gait cycle continues, the heel of the foot rises releasing the pressure on heel compartment 308 and removing the seal covering the hole. Air, preferably from inside the shoe or alternatively from a tube directed outside of the shoe, is forced through the hole to equalize the pressure in heel compartment 308. Consequently, a inflating mechanism is created that consistently provides air to bladder 330 with each step. Alternatively, a butterfly valve could be used instead of a hole. One example is disclosed in U.S. Pat. No. 5,372,487 to Pekar, the disclosure of which is incorporated by reference.

Also, as an alternative, heel compartment 308 may include a collapsible foam insert generally equivalent to the volume of heel compartment 308. The heel of the foot compressed the foam insert and heel compartment 308 in a typical gait cycle. As the heel is released, the foam insert expands to its original shape expanding the volume of the heel compartment 308 and allowing air to enter with the expansion of the heel compartment 308. A further example of a heel compartment comprising a foam insert is describe in detail below with respect to FIG. 5.

Lateral compartment 356 is further fluidly connected to midfoot compartment 362 through passageway 322, and forefoot compartment 364 is fluidly connected to lateral compartment 356 through one-way valve 380.

FIG. 3 shows a second inflation mechanism in forefoot compartment 364. This inflation mechanism is designed to work the same as the inflation mechanism discussed above for the heel compartment 308. In this embodiment, air is forced into lateral compartment 356 through one-way valve 380 as the forefoot rolls onto forefoot compartment 364. Air is allowed to enter forefoot compartment 364 via a hole as discussed above or via a valve as described above. Also, forefoot compartment 364 may comprise a foam insert, as described above for heel compartment 308. In other words, the shoe of FIG. 3 utilizes two inflation mechanisms, which together decrease the time it takes to inflate the bladder. By using two inflation mechanisms, one in the heel and one in the forefoot, a user begins to feel the shoe inflating in only a few steps.

In FIG. 3, both the forefoot compartment 364 and the heel compartment 308 are shown to inflate the bladder. It should be understood that as an alternative, the forefoot compartment 364 could be orientated to inflate one portion of the bladder while heel compartment 308 inflates another portion of the bladder. Weld lines can be utilized to isolate portion of the bladder to accomplish this result.

Lateral compartment 356 is fluidly connected to lateral heel compartment 357 through fluid passageway 370. Lateral heel compartment 357 is fluidly connected to medial heel compartment 359 via fluid connection junction 358, providing support around the heel portion 108 of shoe 100. Medial heel compartment 359 is fluidly connected to medial compartment 354 through fluid passageways 372 and 374. Medial compartment 354 is also fluidly connected to arch compartment 352.

FIG. 3 shows that forefoot compartment 364, midfoot compartment 362, lateral compartment 356, medial compartment 354, lateral heel compartment 357 and medial heel compartment 359 maybe further compartmentalized for the same purpose as the similar features of FIG. 2. Also, the arch compartment 352 may have welds 270 similar to those described for FIG. 2.

Consequently, as a foot moves through a typical gait cycle, the pressure caused by the foot to the various compartments located under the foot forces the air into the various other fluidly connected parts of the bladder to provide added support around the medial side, lateral side and heel of the foot.

The embodiment described in FIG. 3 may also have a deflation valve 109 which opens bladder 330 to the atmosphere to reduce the amount of air in bladder 330. Bladder 330 may have a release valve, wherein the individual wearer can release just the amount of pressure he or she desires, a check valve, which opens only when the air pressure in bladder 330 reaches a predetermined pressure, or a combination thereof as described below with respect to FIGS. 7a–7d. Bladder 330 may alternatively comprise an adjustable check valve, wherein the user can adjust the pressure at which the valve opens. Bladder 330 may have one or more inflation mechanisms with a one-way valve which itself may act as a system to regulate the pressure or perforations, as described above with respect to the embodiment of bladder 130.

In other embodiments, bladder 330 of the present invention may include one or more manually operated inflation mechanisms located on the tongue of the shoe, near the heel of the shoe, on a lateral or medial side of the shoe, or anywhere else on the shoe as would be apparent to one skilled in the relevant art.

Figure 4:
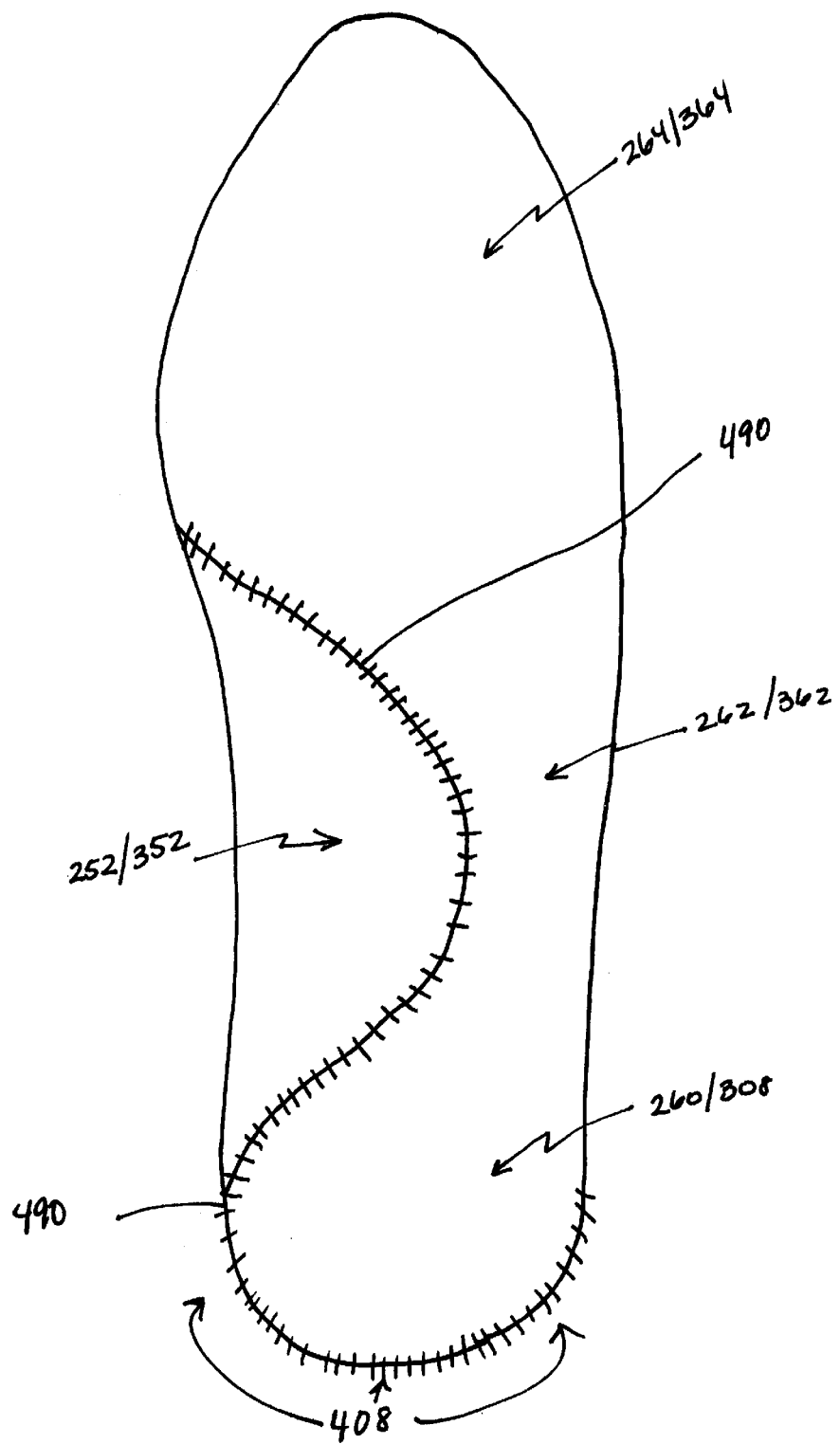
FIG. 4 is a top view showing the stitching of the bladder of FIG. 2 or 3.

In an embodiment as shown in FIG. 4, a bladder of the present invention, similar to those described in FIGS. 2 and 3, is stitched together by an S-shaped stitch 490 located under the foot of the weaver. This stitching is placed in a stitching margin of periphery weld lines that are formed when the bladder is die cut. The stitching connects a portion of the periphery weld of an arch compartment 252/352 against the periphery weld of the midfoot compartment 262/362 and heel compartment 260/308 to the periphery weld disposed in area 408 below the fluid conjunctions 274, 358, of FIGS. 2 and 3. Because the various compartments are sewn together, the bladder of the present invention forms a boot which completely surrounds the foot of the wearer. Because the components of the present invention are sewn together, the medial compartments 254, 354, of FIGS. 2 and 3, and lateral compartment 256, 356, of FIGS. 2 and 3, receive support from the other compartment. This support allows the bladder of the present invention to function as the upper itself.

Stitching is only one method for connecting these portions of the bladder. Alternatively, they may be adhered by glueing, bonding, RF welding, heat welding, ultrasonic welding, or another other method known to one skilled in the art.

Figure 5:
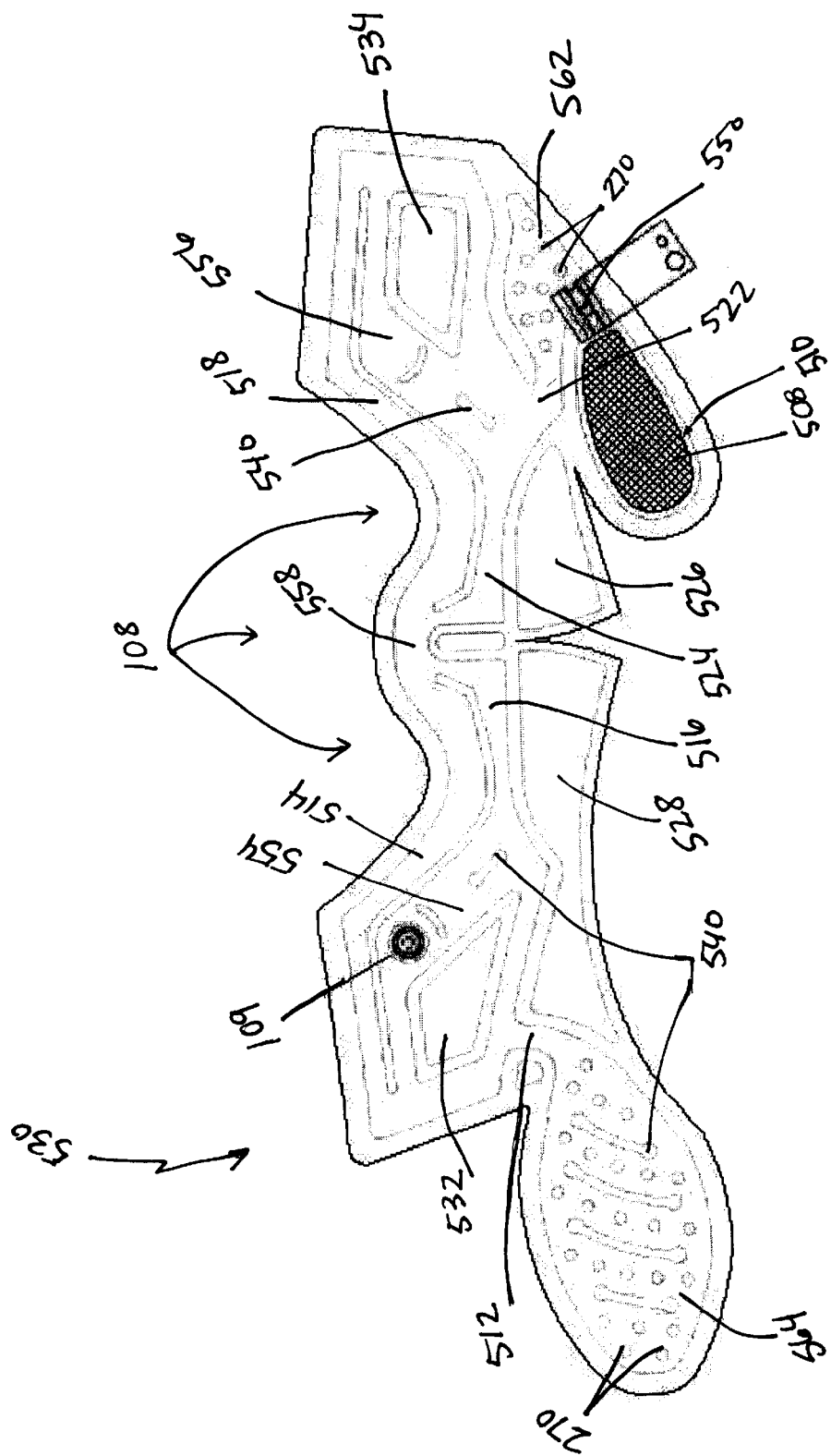

In FIG. 5, another embodiment is described wherein a bladder 530 has an alternative design. Bladder 530 includes a forefoot compartment 564, which is fluidly connected to lateral compartment 554 through fluid passageway 512. Lateral compartment 554 is fluidly connected to fluid connection junction 558 through fluid passageways 514 and 516. Lateral compartment 554 and medial compartment 556 are fluidly connected across connection junction 558, which cushions the heel of the foot. Fluid connection junction 558 is fluidly connected to medial compartment 556 through fluid passageways 518 and 524. Medial compartment 556 is fluidly connected to midfoot compartment 562 through fluid passageway 522. Heel compartment 508 is fluidly connected to midfoot compartment 562 through one-way valve 520. The shape and size of each compartment may vary and may be fluidly connected in any manner by the addition or removal of various internal weld lines, as apparent to one skilled in the art. Further, alternative embodiments may have a greater or fewer number of compartments.

Each of lateral compartment 554 and medial compartment 556 may have pockets formed from internal weld lines which are not fluidly connected to the rest of the compartment. Lateral pocket 532 is located within lateral compartment 554 and medial pocket 534 is located within medial compartment 556. These pockets are pre-inflated and are not part of the adjustable inflation system of the rest of the bladder. Further, bladder 530 comprises a third pocket 528. This third pocket provides support under and along the lateral side of the foot and in heel area 108. Similarly, a fourth pocket 526 provides support to heel area 108. Pockets 528 and 526 may in fact not be inflated. Instead, the two layers remain flat against one another. The weld lines surrounding pockets 528 and 526 keep the area separated from the inflated bladder without the need to weld together the sheets of film in the interior of pockets 528 and 526. Alternatively, lateral pockets 532 and medial pocket 534 could be removed leaving openings in the bladder at the locations designated as 532 and 534.

Bladder 530 may include welds 270, such as those shown in forefoot compartment 564 and midfoot compartment 562. Welds 270 may be of any shape provided that they limit and control the inflation dimensions of the bladder of the present invention. For example, elongated welds 540 can be found in forefoot compartment 564, lateral compartment 554 and medial compartment 540. Elongated welds 540 also define and limit the inflation dimensions of bladder 530.

Any inflation mechanism may be used as described for other embodiments of the present invention. Preferred, however, is the use of heel compartment 508 as an inflation mechanism. As can be seen in FIG. 5, heel compartment 508 includes a foam core 510. Foam core 510 is likely a conventional porous polyurethane foam, such as the 4.25–4.79 pound per cubic foot polyether polyurethane foam, part number FS-170-450TN, available from Woodbridge Foam Fabricating, 1120-T Judd Rd., Chattanooga, Tenn., 37406. As a user's heel steps down in a typical gait cycle, heel compartment 508 and foam core 510 are compressed. The air in heel compartment 508 and foam core 510 is forced through one-way valve 520, into midfoot compartment 562 and throughout the other fluidly connected compartments of bladder 530. As the user's heel rises, air enters heel compartment 508 through a hole or through a one-way valve open to the atmosphere. The foam core 510 has a natural elasticity, such that the foam expands to its natural condition ensuring that heel compartment 508 expands with it. Air enters and takes up the whole volume of heel compartment 508.

Further, a shoe with an underfoot inflation mechanism may comprise a sole with an indented recess, or cavity, (not shown) substantially adjacent to the inflation mechanism and substantially the shape of the inflation mechanism. When the shoe is constructed, the inflation mechanism is inserted into the indented recess. During a typical gait cycle, the inflation mechanism is compressed between the indented recess and the foot such that the foot may sink into the indented recess. The indented recess may be located in either an outsole or a midsole portion of the sole.

Bladder 530 may utilize perforations or the one-way valve as a technique for limiting the about of pressure build-up. Alternatively, deflation valve 109 may be a release valve, check valve, a combination check valve and release valve (see below), or an adjustable check valve. Further more than one type of deflation valve 109 may be used. FIG. 5 shows one location for a generic deflation valve 109, however, a deflation valve may be located on any portion of bladder 530.

Figure 6:
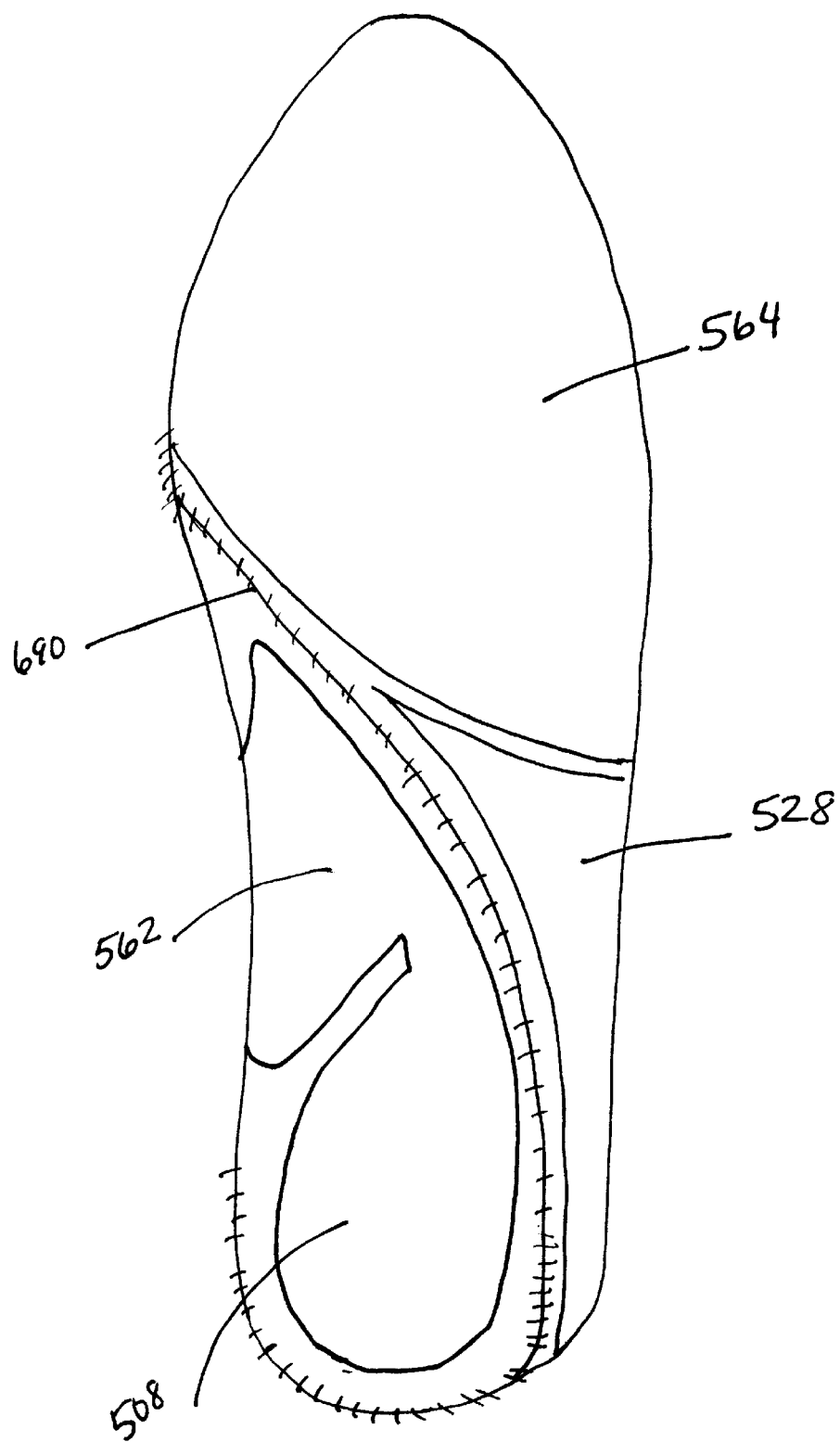
FIG. 6 is a top view showing the stitching of a bladder of FIG. 4.
Figure 1:
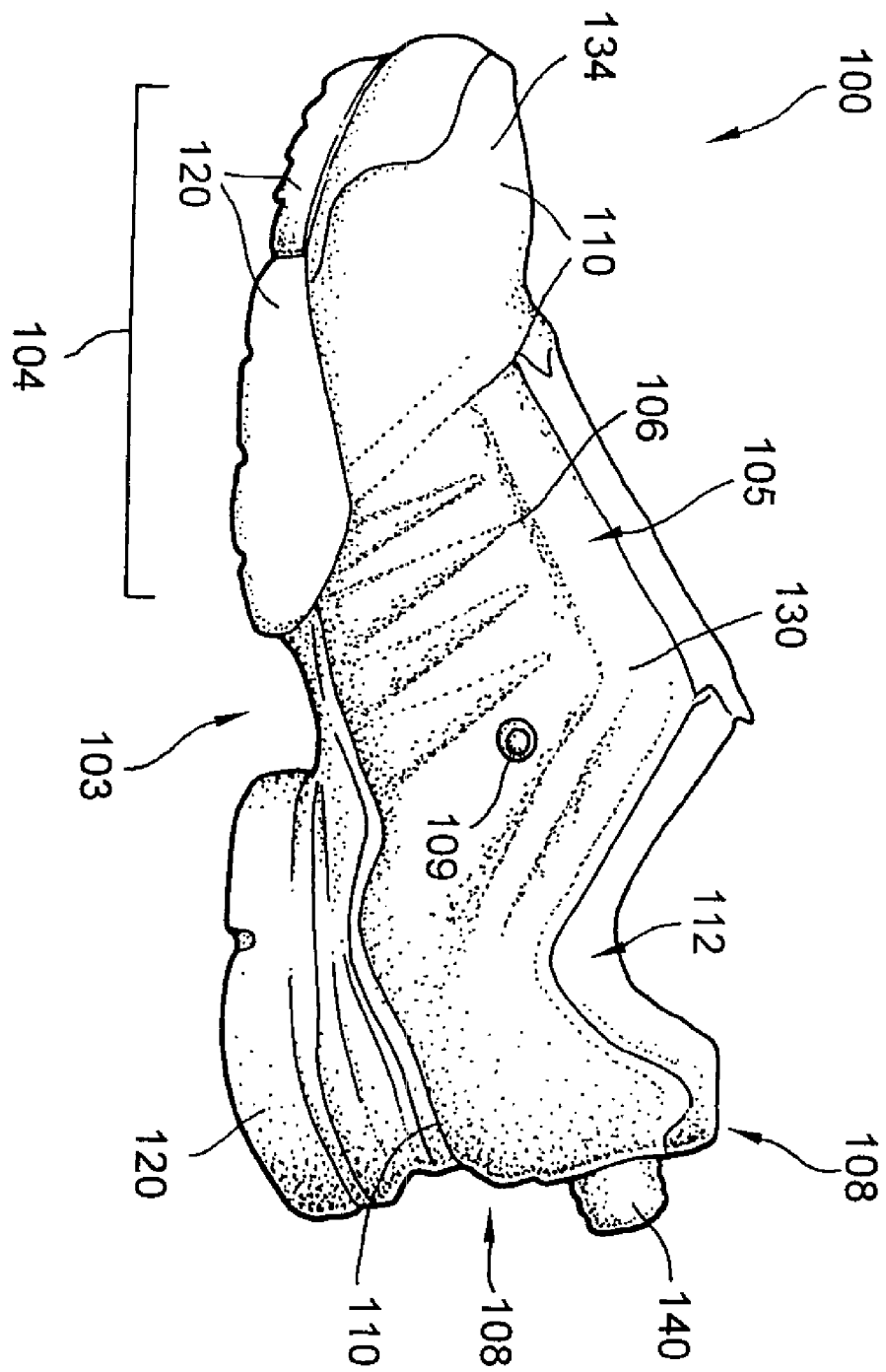
Figure 2:
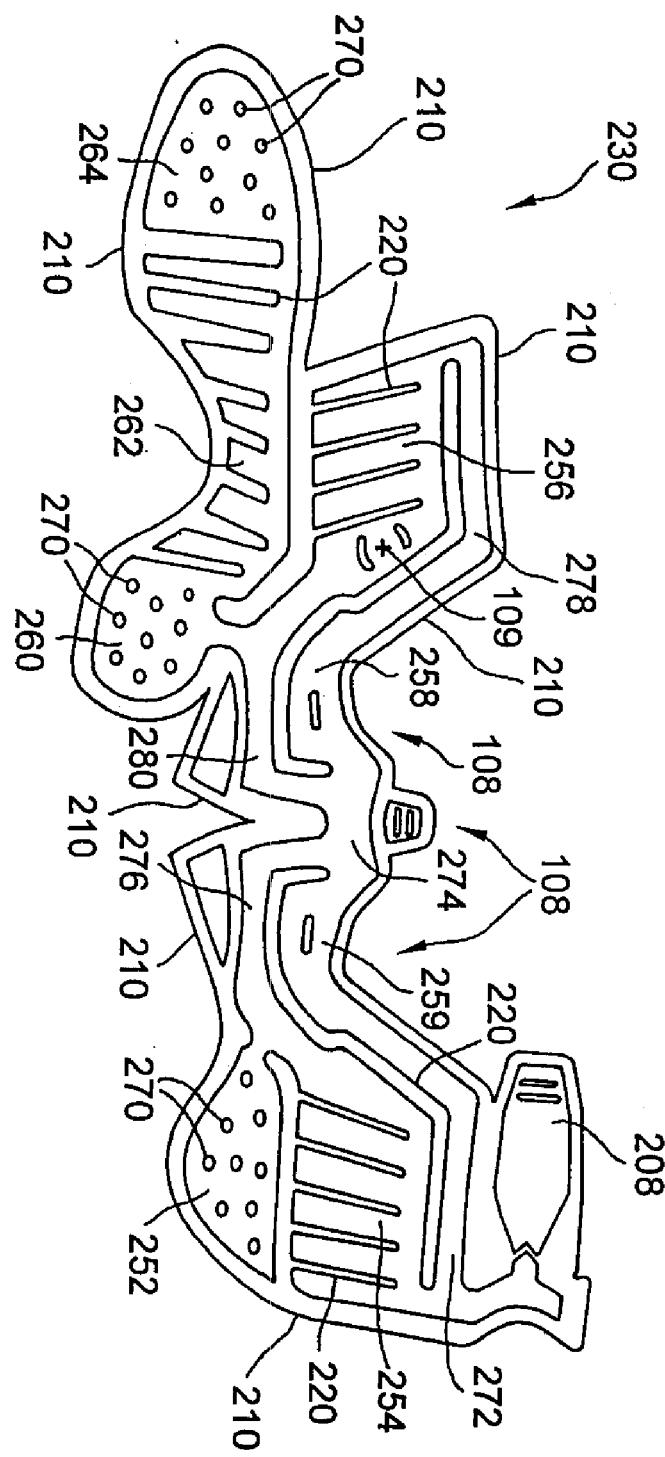
Figure 3:
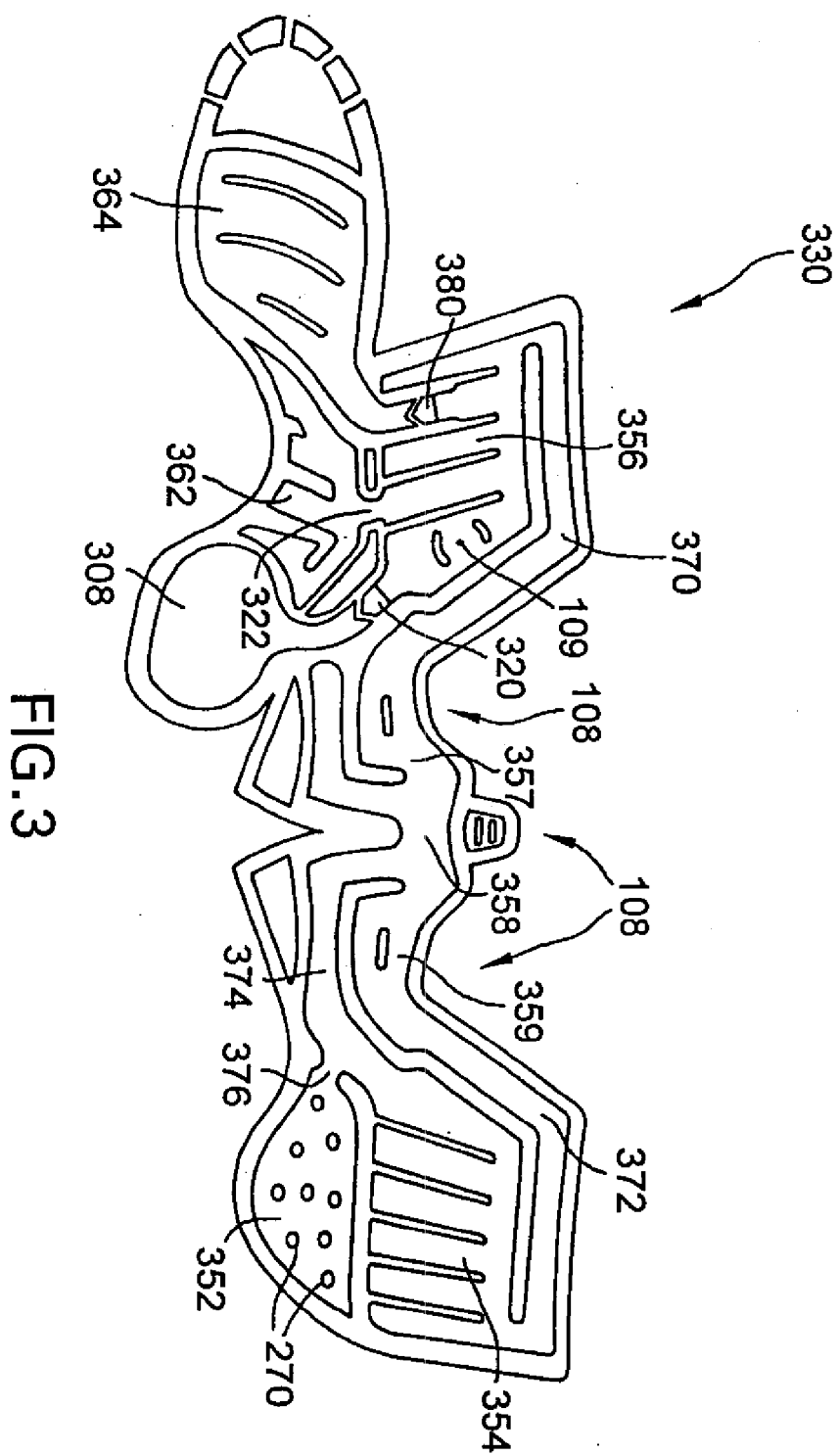
Figure 4:
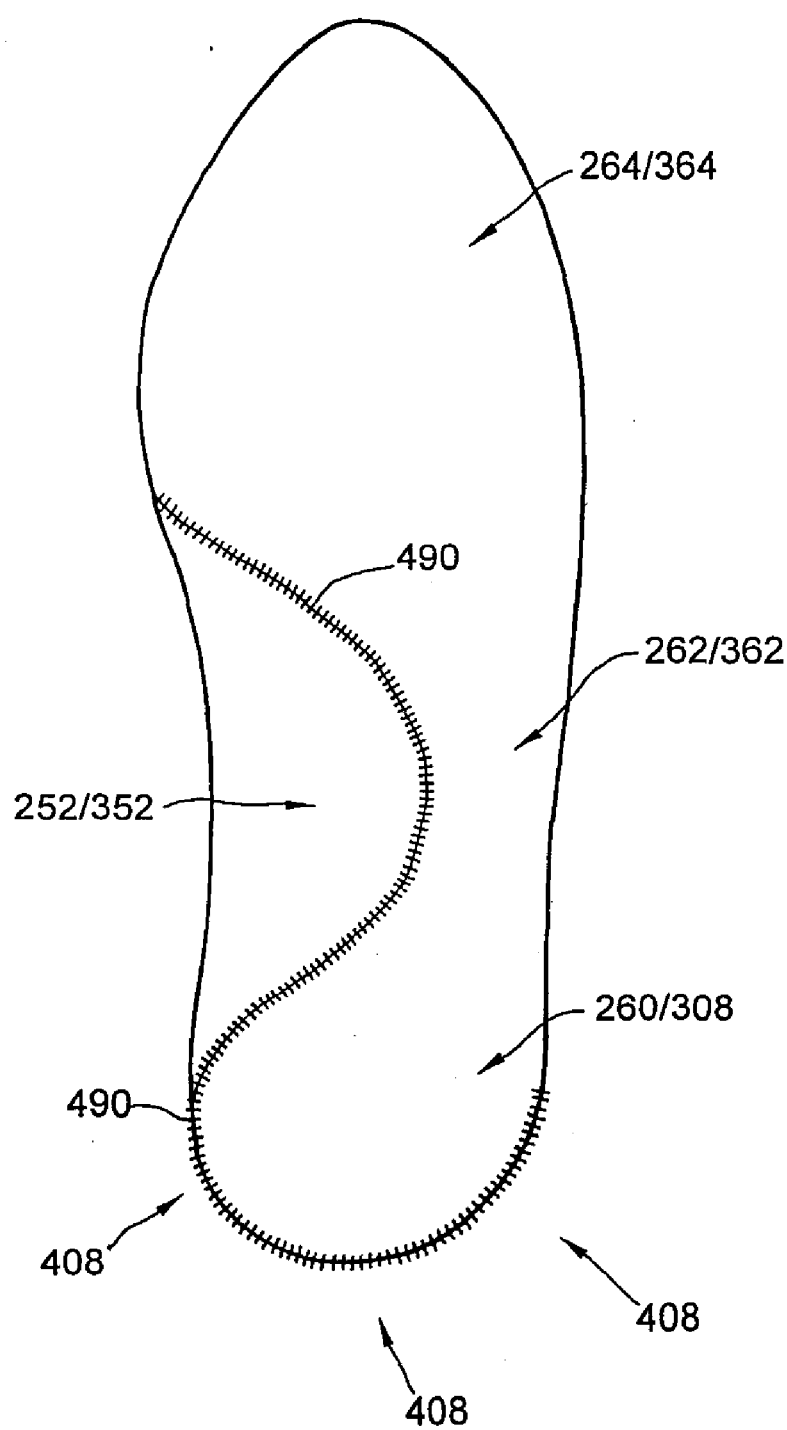
Figure 5:
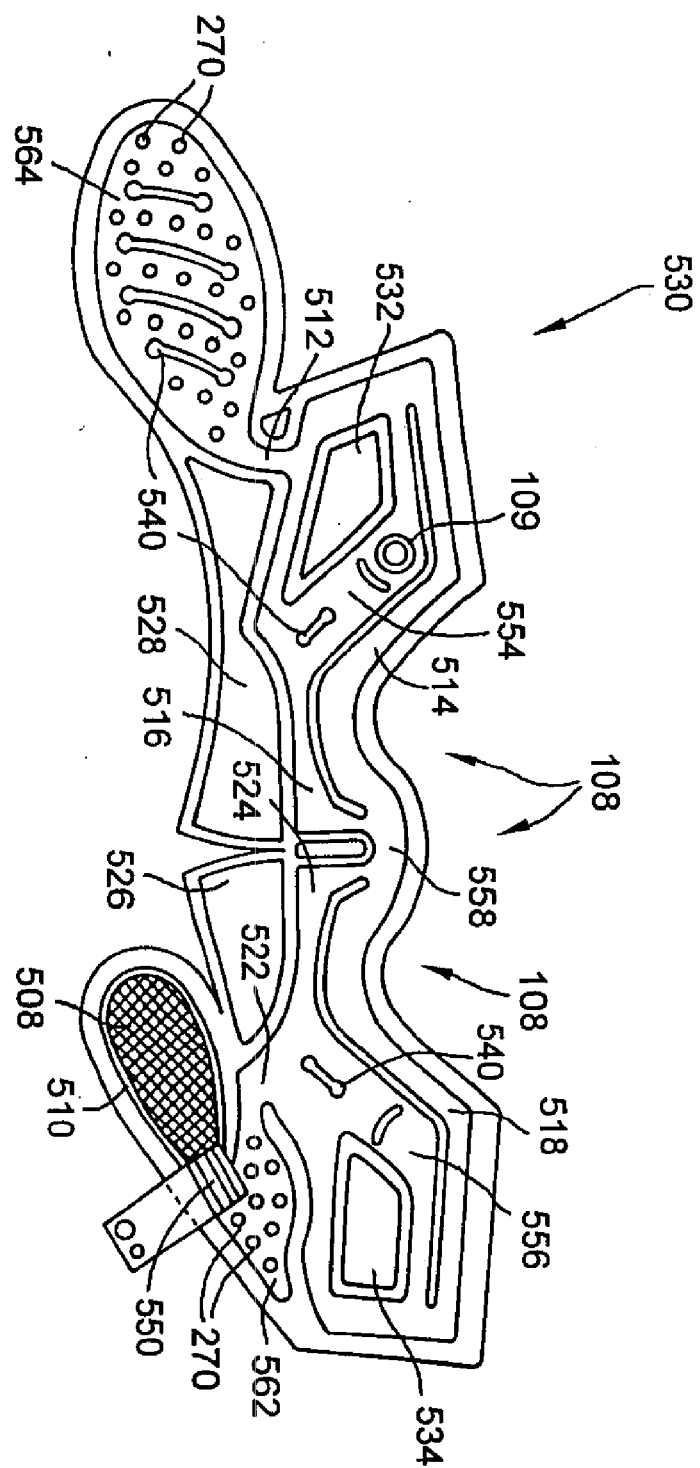
Figure 6:
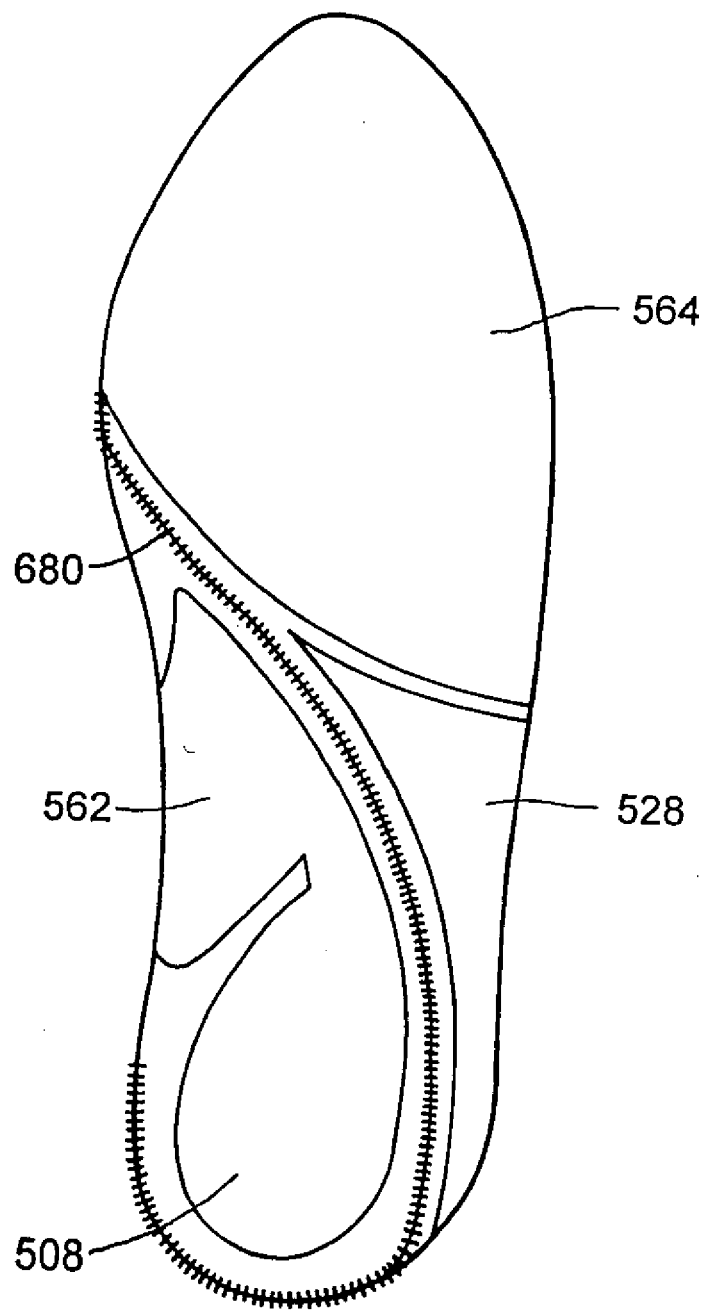

In an embodiment as shown in FIG. 6, a bladder of the present invention, similar to that described in FIG. 5 is stitched together by an J-shaped stitch 690 located under the foot of the user. This stitching is placed in a stitching margin which is formed when the bladder is formed. The stitching connects a portion of the periphery weld line around forefoot compartment 564 to the periphery weld line around midfoot compartment 562 and third pocket 528 to the periphery weld line around midfoot compartment 562 and heel compartment 508, as seen in FIG. 5. In addition, the periphery weld line around heel compartment 508 is stitched to the periphery weld line adjacent to fourth pocket 526. Because the various compartments are sewn together, the bladder of the present invention forms a boot, which completely surrounds the foot of the wearer. The support of this boot allows the bladder of the present invention to function as the upper itself.

Stitching is only one method for constructing the bladder. Alternatively, periphery weld lines may be adhered by glueing, bonding, RF welding, heat welding, ultrasonic welding, or another other method known to one skilled in the art.

As discussed above, the present invention may include a combination check valve and release valve. This combination check valve and release valve is depicted in FIGS. 7a–7d. The combination release valve and check valve 701 is made from sleeve 704, spring 702, base 706, umbrella valve 708 and cap 710. FIG. 7a shows an exploded view of how sleeve 704 is supported in base 706. Sleeve 704 has a lip 712 which rest on spring 702. Spring 702 fits into base 706. Sleeve 704 is preferably made of aluminum to ensure a quality surface of lip 712. Alternatively, sleeve 704 can be made from any number of plastic materials or other materials which would be known to one skilled in the art. Preferably, all the materials in combination release valve and check valve 701 are lightweight. Spring 702 is preferably made from stainless steel but may be made from a variety of metals or other materials.

FIG. 7b is an exploded view of the entire combination release valve and check valve 701. Cap 710 has a surface portion 738 and a side portion 740. Cap 710 and base 706 both may be formed from a molded plastic. Preferably, cap 710 and base 706 are formed from an injection-molded resin. More preferably, Cap 710 may be injection molded from Estane 58863 (85A hardness), while base 706 may be injection molded from Bayer resin (60D hardness). Umbrella valve 708 sits through a hole 730 in the bottom of sleeve 704, as shown in FIG. 7a.

An assembled combination release valve and check valve 701 is shown in FIG. 7c, wherein the release valve mechanism is not activated. Base 706 is in contact with the bladder. Air enters the combination release valve and check valve 701 via a hole 720 in base 706 which is fluidly connected to the bladder of the present invention.

FIG. 7c shows umbrella valve 708 having the general shape of an umbrella and forming an air-tight seal against sleeve 704. The umbrella-shape is generally thick in the middle but forms a thin flap 718 which rests and forms an air tight seal against sleeve 704. Air from the bladder travels through a first hole 722 located in the base of the umbrella valve 708 and through a second hole 724 located underneath the umbrella. Umbrella valve 708 is preferably made of a material which is more rigid when thick and somewhat flexible when thin, such as silicone, so that thin flap 718 is somewhat elastic.

When the air pressure underneath the umbrella shape, and therefore the pressure in the bladder of the present invention, reaches a predetermined pressure, thin flap 718 is deformed and lifted off of the sleeve 704. Air is then allowed to escape through holes 716 in the surface portion 738 of cap 710. Dotted line 728 shows the route of air through the release valve portion of combination release valve and check valve 701. When the air pressure in the bladder and under the umbrella becomes less than the predetermined pressure, the thin flap 718 returns to its natural shape an again creating a seal against sleeve 704. The preferred umbrella valve 708, commercially available as VA-3497 Umbrella Check Valve (Part No. VL1682-104) from Vernay Laboratories, Inc. (Yellow Springs, Ohio, USA), typically deforms when the pressure in the bladder is around 5 pounds per square inch. Any other type of umbrella valve, however, would be suitable in the combination check valve and release valve of the present invention, as would be clear to one skilled in the art.

Spring 702, as seen in FIG. 7c is in a slightly compressed state such that it holds sleeve 704 firmly and air-tightly against cap 710 so that the only air that may escape is through umbrella valve 704, as describe above. In particular, an air tight seal is formed by the pressure of lip 712 of sleeve 704 against a molded hinge 714 jutting from cap 710. When the surface portion of cap 710 is pressed, cap 710 deforms, as can be seen in FIG. 7d. When this occurs the surface portion 738 becomes flat pressing down on an upper rim 742 of sleeve 704. As sleeve 704 is forced downward, spring 702 compresses and lip 712 is pulled away from hinge 714. A gap 726 between hinge 714 and lip 712 allows air to escape out holes 716 in cap 710. Dotted line 729 shows the path of air flow when the release valve portion of combination release valve and check valve is activated.

In order to avoid a finger or thumb covering the holes located on the top of cap 710 and preventing the air from escaping through holes 716, an embodiment may include an extension or wall sticking out from the surface portion 738 of cap 710. For example, one embodiment may have a ring-shaped wall (not shown) outside of the holes 716. The ring-shaped wall further has holes in the sides of the wall, such that when a finger or thumb is placed on the ring-shaped wall, the wall pushes down on the cap 710 rather than the finger or thumb. The air that escapes through holes 716 is still trapped by the finger or thumb from the top, but can escape through the holes in the sides of the ring-shaped wall. Another embodiment may have an extension sticking out from the center of surface portion 738. When the extension is depressed, the cap 710 depresses without covering the holes 716. An additional cap may be placed on top of the extension or wall to provide a bigger surface for a finger or thumb to depress the extension or wall. Consequently, the air is allowed to escape from a gap between cap 710 and the additional cap.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. For example, a bladder of the present invention may be pre-inflated at the factory. A bladder of this type would not require an inflation mechanism or a deflation valve.

Thus, the breadth and scope of the present invention should not be limited by any of the above-described exemplary embodiments, but should be defined only in accordance with the following claims and their equivalents. Additionally, all references cited herein, including issued U.S. patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. Footwear, comprising:

a sole;

an upper attached to said sole wherein a portion of an interior and a portion of an exterior of said upper is formed by an inflatable bladder;

an inflation mechanism substantially permanently attached to said sole and wherein said upper and said inflation mechanism are monolithic.

2. The footwear of claim 1, wherein said bladder is formed from a first film and a second film.

3. The footwear of claim 1, wherein said first film and said second film comprise urethane.

4. The footwear of claim 1, wherein said bladder is formed from at least one laminate material.

5. The footwear of claim 4, wherein said laminate material comprises a cloth laminae.

6. The footwear of claim 4, wherein said laminate material comprises a polyurethane laminae.

7. The footwear of claim 4, wherein said laminate material comprises a polyurethane layer and a cloth layer.

8. The footwear of claim 1, wherein said sole comprises a foam midsole.

9. The footwear of claim 8, wherein said midsole includes a top surface and wherein a cavity is formed in said top surface.

10. The footwear of claim 9, wherein a portion of said inflation mechanism is disposed within said cavity.

11. The footwear of claim 2, wherein at least one of said first or said second films is perforated to allow air to diffuse out of said bladder when air within said bladder exceeds preselected pressure.

12. The footwear of claim 1, wherein said inflation mechanism is positioned in a location which allows said inflation mechanism to automatically introduce air into said bladder as a wearer engages in an activity.

13. The article of footwear of claim 1, wherein said inflatable bladder comprises one or more pockets made form interior weld lines, said pockets being removed to leaving openings in the bladder.

14. The article of footwear of claim 1, further including a one way valve between said inflation mechanism and the exterior of said inflatable bladder.

15. The article of footwear of claim 14, wherein said one way valve is fluidly connected to a tube directed to ambient air outside of said article of footwear.

16. An article of footwear comprising:

a sole;

an upper, said upper having an outer surface and wherein at least a portion of said outer surface of said upper is formed from an inflatable bladder; and an inflation mechanism for selectively introducing air to said bladder, wherein said inflation mechanism is disposed in a location which allows operation by pressure of a user's foot exerting force on said inflation mechanism and wherein said upper and said inflation mechanism are monolithic.

17. The article of footwear of claim 16, further comprising a release valve, wherein said release vale provides communication between said bladder and the ambient atmosphere, whereby a user can reduce the amount of air in said bladder.

18. The article of footwear of 16, claim further comprising a check valve, wherein said check valve provides communication between said bladder and the ambient atmosphere, whereby the pressure in said bladder is automatically released.

19. The article of footwear of claim 16, further comprising a combination check valve and release valve.

20. The article of footwear of claim 16, wherein said bladder comprises two sheets of urethane film which are welded together.

21. The article of footwear of claim 16, wherein said inflation mechanism is located substantially under the heel of the foot.

22. The article of footwear of claim 21, wherein said inflation mechanism further comprises a foam insert.

23. The article of footwear of claim 16, wherein said bladder is formed from a laminate.

24. The article of footwear of claim 23, wherein said laminate comprises a polyurethane film laminae.

25. The article of footwear of claim 23, wherein said laminate comprise a cloth laminae.

26. The article of footwear of claim 23, wherein said laminate comprises a cloth laminae and a polyurethane film laminae.

27. The article of footwear of claim 16, wherein said inflatable bladder comprises one or more pockets made from interior weld lines, said pockets being removed to leave openings in the bladder.

28. The article of footwear of claim 16, further including a one way valve between said inflation mechanism and the exterior of said inflatable bladder.

29. The article of footwear of claim 28, wherein said one way valve is fluidly connected to a tube directed to ambient air outside of said article of footwear.

30. An article of footwear comprising:

a sole;

an upper, wherein at least a portion of said upper is formed from an inflatable bladder; and an inflation mechanism for selectively introducing air to said bladder, wherein said inflation mechanism is disposed under the heel of a wearer's foot and is operated by a downward force of a wearer's heel on said inflation mechanism;

wherein said upper and said inflation mechanism are monolithic.

31. The article of footwear of claim 30, wherein said inflation mechanism further comprises a foam insert.

32. The article of footwear of claim 31, wherein said bladder is formed from a laminate.

* * * * *

UNITED STATES PATENT AND TRADEMARK OFFICE
CERTIFICATE OF CORRECTION

PATENT NO. : 6,785,985 B2
DATED : September 7, 2004
INVENTOR(S) : William Marvin It is certified that error appears in the above-identified patent and that said Letters Patent is hereby corrected as shown below:

Replace title page with the attached title page.

Informal Figures 2-6 and 7a-7d are replaced with attached Formal Figures 2-6 and 7a-7d.

Please replace old Drawings with New Drawings Attached.

Signed and Sealed this

Fifteenth Day of February, 2005

JON W. DUDAS
*Director of the United States Patent and Trademark Office*

(12) United States Patent
Marvin et al.

(10) Patent No.: US 6,785,985 B2
(45) Date of Patent: Sep. 7, 2004

(54) SHOE HAVING AN INFLATABLE BLADDER

(75) Inventors: William Marvin, Brighton, MA (US);
Paul M. Davis, Blackstone, MA (US);
Geoff Swales, Somerset, MA (US);
Paul E. Litchfield, Westboro, MA (US)

(73) Assignee: Reebok International Ltd., Canton, MA (US)

( * ) Notice: Subject to any disclaimer, the term of this patent is extended or adjusted under 35 U.S.C. 154(b) by 19 days.

(21) Appl. No.: 10/186,717

(22) Filed: Jul. 2, 2002

(65) Prior Publication Data
US 2004/0003515 A1 Jan. 8, 2004

(51) Int. Cl.$^7$ .................... A43B 13/20; A43B 23/00; A43B 5/00
(52) U.S. Cl. .................... 36/45; 36/29; 36/88
(58) Field of Search .................... 36/29, 28, 88, 36/50.1, 43, 71, 50.5, 3 R, 3 B, 44, 114, 93

(56) References Cited

U.S. PATENT DOCUMENTS

| 82,944 A | 10/1868 | Haskins |
|---|---|---|
| 167,732 A | 10/1875 | Blanchard |
| 180,819 A | 8/1876 | Ames |
| 212,898 A | 3/1879 | Class |
| 508,034 A | 11/1893 | Moore |
| 510,504 A | 12/1893 | Foster |
| 536,345 A | 3/1895 | Harris |
| 545,705 A | 9/1895 | MacDonald |
| 547,645 A | 10/1895 | LaCroix |
| 566,422 A | 8/1896 | Singleton |
| 580,501 A | 4/1897 | Mobberley |
| 586,155 A | 7/1897 | Bascom |
| 634,588 A | 10/1899 | Roche |
| D32,093 S | 1/1900 | Childs |
| 692,170 A | 1/1902 | Wallerstein et al. |
| 710,674 A | 10/1902 | Fassmann |
| 850,327 A | 4/1907 | Tauber |
| 900,867 A | 10/1908 | Miller |
| 918,391 A | 4/1909 | Taarud |
| 950,333 A | 2/1910 | Koch |

(List continued on next page.)

FOREIGN PATENT DOCUMENTS

| BR | 8305004 | 9/1983 |
|---|---|---|
| CA | 1143938 | 11/1982 |

(List continued on next page.)

OTHER PUBLICATIONS

ZONIC Product Description, date unknown.
Superflate by Innovations in Cycling, Inc., Interbike Buyer 1991 International Bicycle Expos, p. 145.

(List continued on next page.)

Primary Examiner—M. D. Patterson
(74) Attorney, Agent, or Firm—Sterne, Kessler, Goldstein & Fox PLLC

(57) ABSTRACT

An article of footwear including a sole and an upper with an exterior and interior surface, and a bladder which comprises at least one of the exterior or interior surfaces. The bladder comprising sheets of polyurethane attached together via welding. The bladder includes a medial compartment and a lateral compartment attached to each other under the foot of the wearer. The article of footwear also includes a inflation mechanism for selectively introducing air to the chambers. The inflation mechanism is located under the foot of the wearer to be activated by the normal action of the wearer.

32 Claims, 7 Drawing Sheets

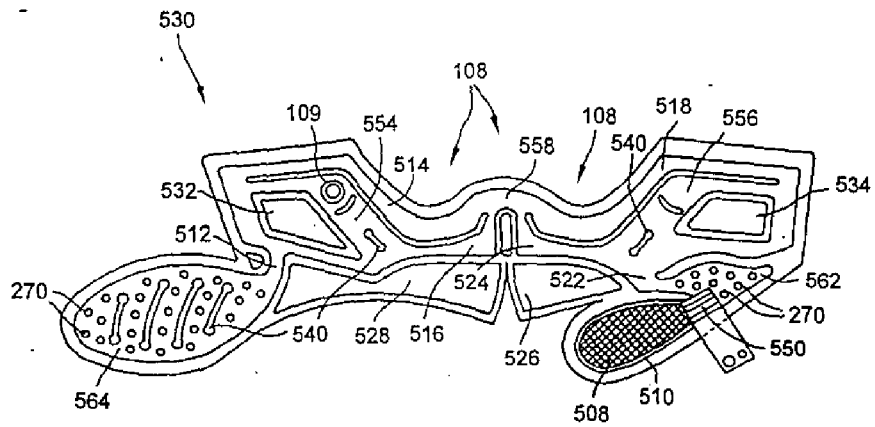

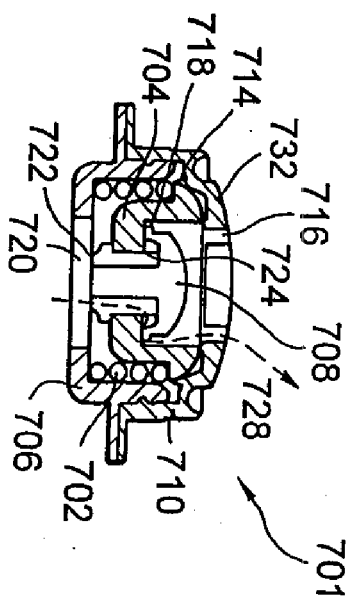
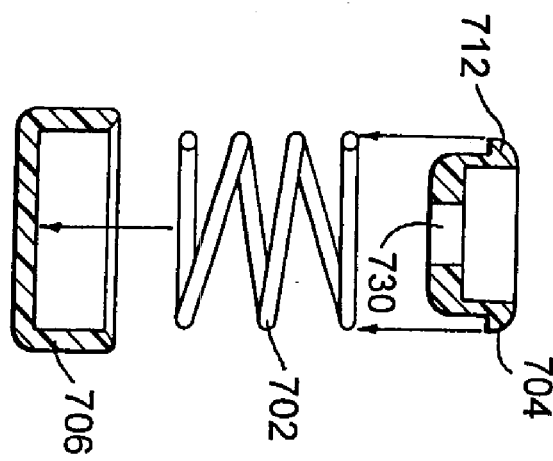
FIG. 7a
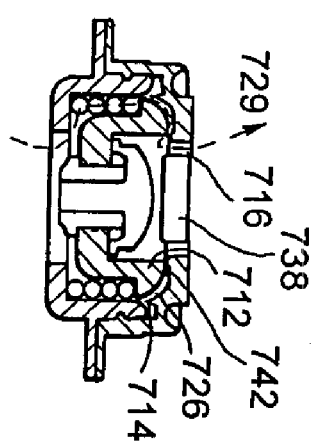
FIG. 7c
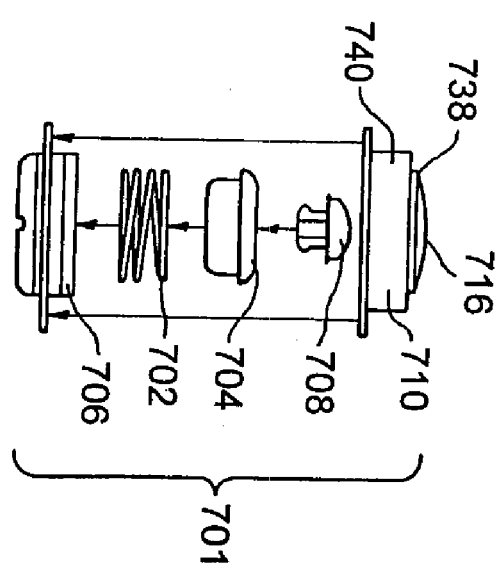
FIG. 7b
FIG. 7d